United States Patent
Saitou

(10) Patent No.: US 8,310,460 B2
(45) Date of Patent: Nov. 13, 2012

(54) TOUCH DISPLAY DEVICE

(75) Inventor: Satoshi Saitou, Sosa (JP)

(73) Assignees: Hitachi Displays, Ltd., Chiba (JP); Panasonic Liquid Crystal Display Co., Ltd., Hyogo-ken (JP)

(*) Notice: Subject to any disclaimer, the term of this patent is extended or adjusted under 35 U.S.C. 154(b) by 424 days.

(21) Appl. No.: 12/683,500

(22) Filed: Jan. 7, 2010

(65) Prior Publication Data
US 2010/0182275 A1 Jul. 22, 2010

(30) Foreign Application Priority Data
Jan. 20, 2009 (JP) .................... 2009-009412

(51) Int. Cl.
*G06F 3/041* (2006.01)
(52) U.S. Cl. .............. 345/173; 178/18.01; 178/19.01; 178/20.01
(58) Field of Classification Search .......... 345/173–179; 178/18.01–20.04
See application file for complete search history.

(56) References Cited

U.S. PATENT DOCUMENTS

| | | | | |
|---|---|---|---|---|
| 7,394,458 B2* | 7/2008 | Lyon et al. | | 345/173 |
| 2005/0030048 A1* | 2/2005 | Bolender et al. | | 324/661 |
| 2007/0262962 A1* | 11/2007 | XiaoPing et al. | | 345/173 |
| 2008/0309633 A1* | 12/2008 | Hotelling et al. | | 345/173 |
| 2009/0244021 A1* | 10/2009 | Matsuo et al. | | 345/173 |
| 2010/0079384 A1* | 4/2010 | Grivna | | 345/173 |

FOREIGN PATENT DOCUMENTS

| | | |
|---|---|---|
| JP | 2007-175050 | 7/2007 |
| JP | 2008-065748 | 3/2008 |

* cited by examiner

*Primary Examiner* — Kevin M Nguyen
*Assistant Examiner* — Cory Almeida
(74) *Attorney, Agent, or Firm* — Antonelli, Terry, Stout & Kraus, LLP.

(57) ABSTRACT

A display device with a touch panel includes a display panel, and an electrostatic-capacitance-coupling touch panel which is arranged on a viewer-side surface of the display panel. The touch panel includes a substrate; a first shield conductor which is formed on the viewer-side surface of the substrate; an insulation film which is formed on the first shield conductor; a plurality of first electrodes which are formed on the insulation film, extend in the first direction and are arranged parallel to each other in the second direction which intersects with the first direction; and a plurality of second electrodes which are formed on the insulation film, extend in the second direction and are arranged parallel to each other in the first direction which intersects with the second direction. A predetermined signal is inputted to the first shield conductor.

8 Claims, 17 Drawing Sheets

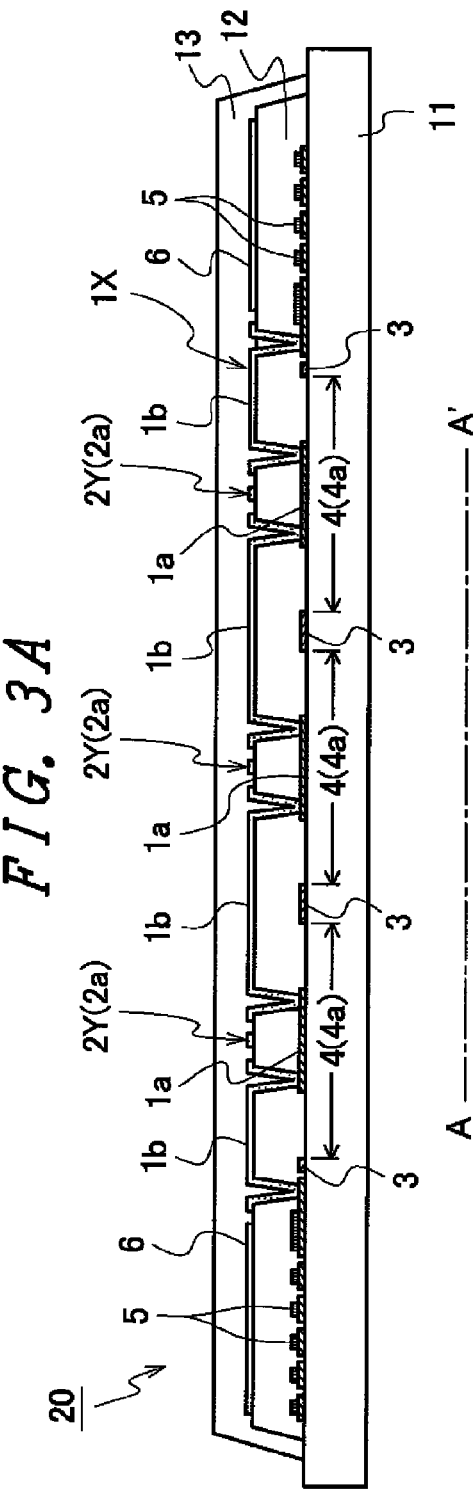
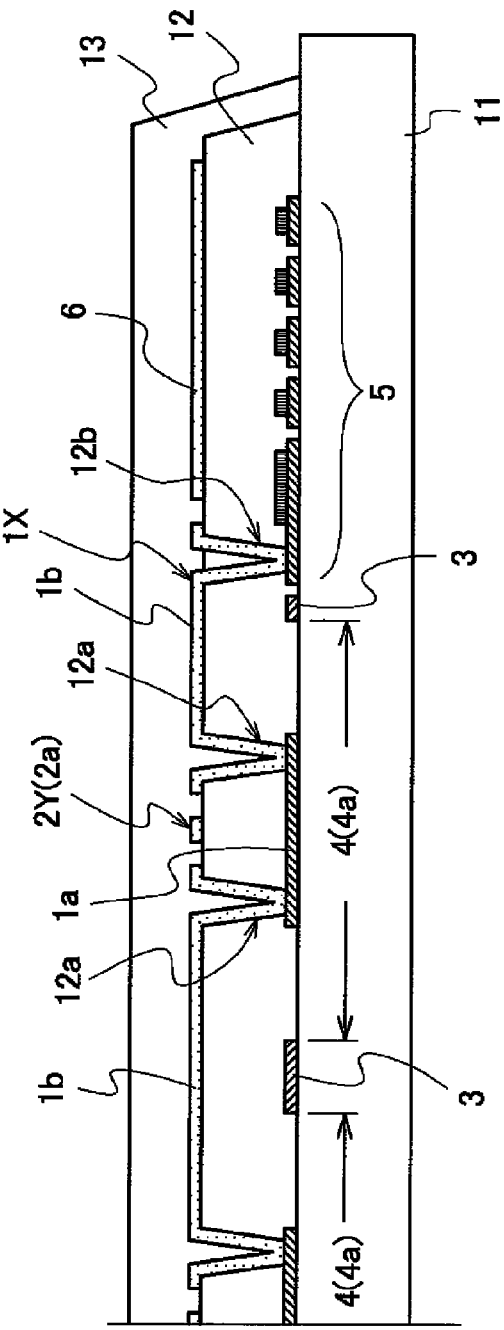
FIG. 3A
FIG. 3B

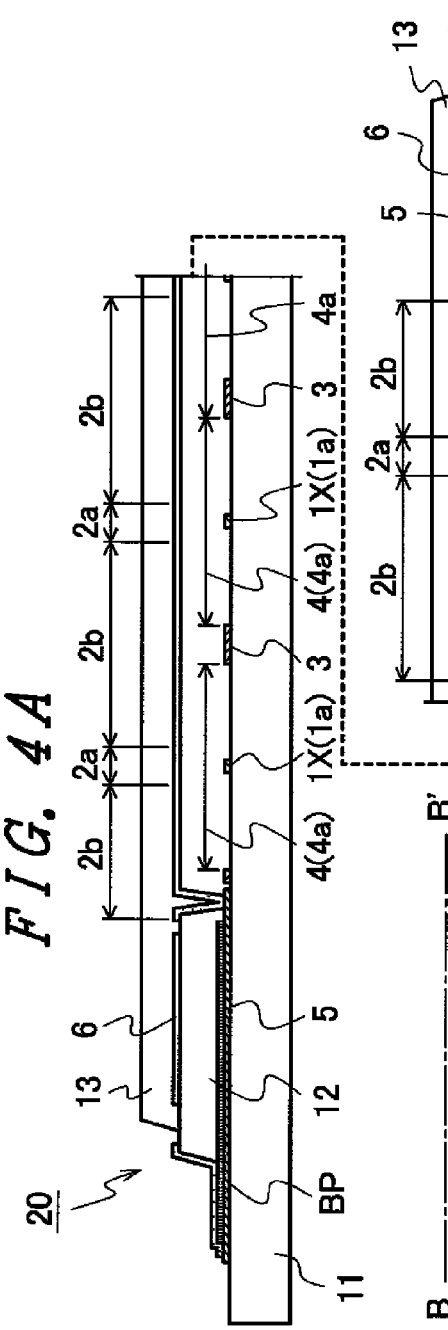
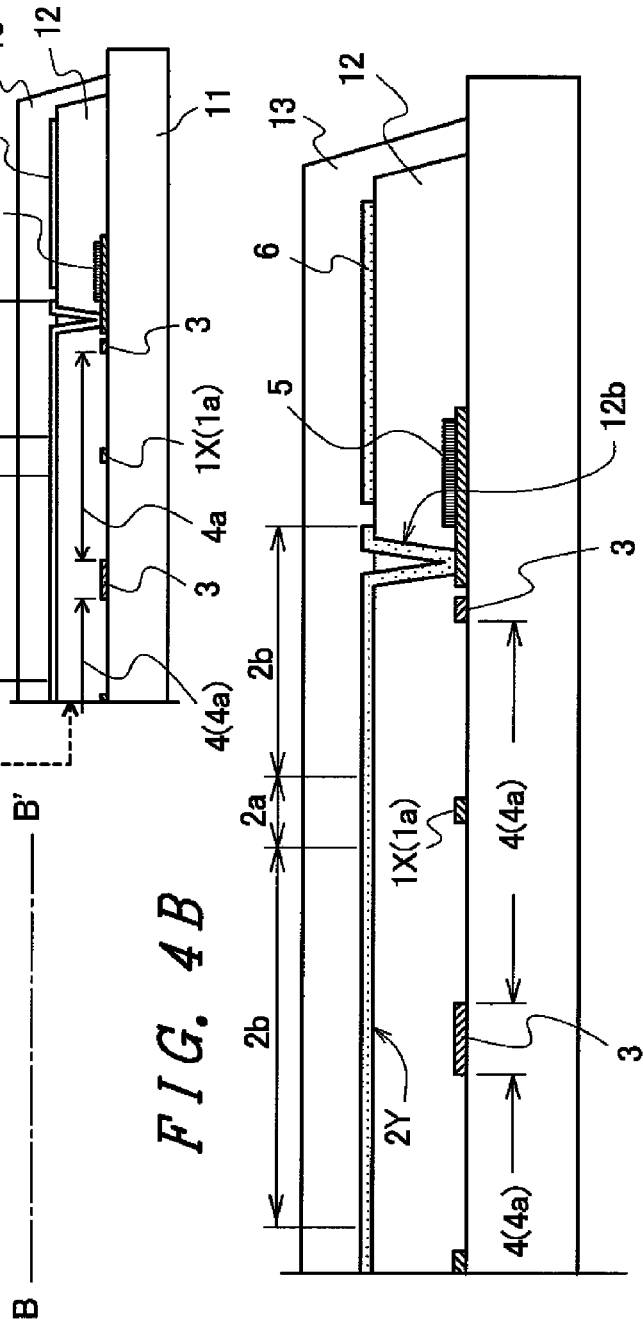
FIG. 4A
FIG. 4B

TOUCH DISPLAY DEVICE

CLAIM OF PRIORITY

The present application claims priority from Japanese application serial No. 2009-9412, filed on Jan. 20, 2009, the content of which is hereby incorporated by reference into this application.

BACKGROUND OF THE INVENTION

1. Field of the Invention

The present invention relates to a touch panel (touch sensor), and more particularly to a display device with an electrostatic-capacitance-coupling touch panel (capacitive sensor).

2. Description of the Related Art

As touch panel techniques which are mainly used, there have been known a technique which detects a change of light, and a technique which detects a change of an electric characteristic. Further, as the technique which detects a change of an electric characteristic, an electrostatic capacitance coupling technique has been known (see JP-A-2008-65748 (patent document 1) and JP-A-2007-175050 (patent document 2)).

FIG. 16 to FIG. 18 are views which show a conventional touch panel which adopts an electrostatic capacitance coupling technique, wherein FIG. 16 is a plan view showing an electrode pattern, FIG. 17 is a cross-sectional view showing the cross-sectional structure of the electrode pattern taken along a line F-F' in FIG. 16, and FIG. 18 is a cross-sectional view showing the cross-sectional structure of the electrode pattern taken along a line G-G' in FIG. 16.

The conventional touch panel which adopts the electrostatic capacitance coupling technique, as shown in FIG. 16 to FIG. 18, includes a plurality of electrodes 1X which extend in the first direction (for example, X direction) and are arranged parallel to each other in the second direction (for example, Y direction) which intersects with the first direction, and a plurality of electrodes 2Y which extend in the second direction while intersecting with the electrodes 1X and are arranged parallel to each other in the first direction. The plurality of electrodes 2Y are arranged on a substrate 11, and are covered with an insulation film 12 formed on the electrodes 2Y. The plurality of electrodes 1X are arranged on an insulation film 12, and are covered with an insulation film 13 formed over the plurality of electrodes 1X. The electrodes 1X and the electrodes 2Y are made of a transparent conductive material such as ITO (Indium Tin oxide), for example.

Further, the conventional touch panel which adopts an electrostatic capacitance coupling technique includes, as shown in FIG. 17 and FIG. 18, a planar shield conductor 15 on a surface of the substrate 11 on a side opposite to a viewer's side. A predetermined signal is inputted to the shield conductor 15 thus reducing the noises transmitted to the touch panel from the display panel. The shield conductor 15 is formed of a transparent conductive film made of ITO or the like, for example.

SUMMARY OF THE INVENTION

In the conventional touch panel which adopts an electrostatic capacitance coupling technique, as shown in FIG. 16 to FIG. 18, a plurality of electrodes 1X and a plurality of electrodes 2Y are formed on conductive layers (lower layer and upper layer) different from each other respectively by way of the insulation film 12. In such electrode structure, with respect to the insulation film 12 and a protective film 13 which is formed on the electrode 1X, strain is generated in these films due to the electrodes 1X formed on the insulation film 12. Further, with respect to a reflection light, the lower layer and the upper layer have the different optical path lengths and hence, the color difference occurs between the electrodes 1X which are formed on the lower layer and the electrodes 2Y which are formed on the upper layer thus making electrode patterns of the electrodes 1X and the electrodes 2Y appear conspicuously. Such conspicuous appearance of the electrode patterns brings about worsening of optical characteristics leading to lowering of characteristics of a display device which incorporates a touch panel therein. Accordingly, it is necessary to take a countermeasure to cope with such a drawback.

Further, in the conventional touch panel which adopts an electrostatic capacitance coupling technique, as shown in FIG. 17 and FIG. 18, a shield conductor 15 is formed on a surface (back surface) of the substrate 11 opposite to a viewer-side surface (main surface). In such structure, as transparent conductive material layers, it is necessary to provide three transparent conductive material layers consisting of the transparent conductive material layer for forming the electrode 1X, the transparent conductive material layer for forming the electrode 2Y and, further, the transparent conductive material layer for forming the shield conductor 15. This structure becomes a factor which impedes the reduction of cost.

Inventors of the present invention have made the present invention by focusing on these three transparent conductive material layers consisting of the electrodes 1X, the electrodes 2Y and the shield conductor 15.

It is an object of the present invention to provide a technique which can realize the suppression of lowering of characteristics and the reduction of cost in a display device with a touch panel.

The above-mentioned and other objects and novel technical features of the present invention will become apparent from the description of this specification and attached drawings.

(1) According to one aspect of the present invention, there is provided a display device with a touch panel which includes: a display panel; and an electrostatic-capacitance-coupling touch panel which is arranged on a viewer-side surface of the display panel, wherein the touch panel includes: a substrate; a first shield conductor which is formed on the viewer-side surface of the substrate; an insulation film which is formed on the first shield conductor; a plurality of first electrodes which are formed on the insulation film, extend in the first direction and are arranged parallel to each other in the second direction which intersects with the first direction; and a plurality of second electrodes which are formed on the insulation film, extend in the second direction and are arranged parallel to each other in the first direction which intersects with the second direction, wherein a predetermined signal is inputted to the first shield conductor, each one of the plurality of first electrodes includes a first portion which is formed on the viewer-side surface of the substrate and the second portion which is formed in a separated manner from the second electrode on the insulation film, the first portion is connected to the second portion via a contact hole formed in the insulation film, the first shield conductor has a plurality of opening portions, the plurality of opening portions include first opening portions in which the first portions are formed in openings and second opening portions in which the first portions are not formed in the openings, and the first portions are formed in the first opening portions.

(2) In the display device with a touch panel having the above-mentioned constitution (1), the first shield conductor has a meshed shape constituted of first members and second members which intersect with each other, and the first opening portions and the second opening portions are respectively opening portions which are formed by the first members and the second members which constitute the meshed shape.

(3) In the display device with a touch panel having the above-mentioned constitution (2), the second electrode has first portions which intersect with the first portions of the first electrode in plane and second portions which are contiguously formed with the first portions, the second portion of the first electrode has a planar square shape in which a width of the second portion of the first electrode is larger than a width of the first portion of the first electrode, the second portion of the second electrode has a planar square shape in which a width of the second portion of the second electrode is larger than a width of the first portion of the second electrode, the second portion of the first electrode and the second portion of the second electrode are arranged in a state where a side of the second portion of the first electrode and a side of the second portion of the second electrode which face each other in an opposed manner make an acute angle with respect to the first direction, and the first member and the second member of the first shield conductor which constitute the meshed shape are formed along the side of the second portion of the first electrode and along the side of the second portion of the second electrode which face each other in an opposed manner.

(4) In the display device with a touch panel having the above-mentioned constitution (3), at least one of the first members and at least one of the second members of the first shield conductor which constitute the meshed shape are arranged between the first portions of two first electrodes arranged adjacent to each other.

(5) In the display device with a touch panel having the above-mentioned constitution (1), the display device further includes a plurality of lines which are formed around a region where the plurality of first electrodes and the plurality of second electrodes are formed, and are electrically connected to the plurality of first electrodes or the plurality of second electrodes respectively, the plurality of lines are formed on the viewer-side surface of the substrate, and the display device further includes a second shield conductor which is formed on the insulation film so as to cover the plurality of lines, and to which a predetermined signal is inputted.

(6) In the display device with a touch panel having any one of the above-mentioned constitutions (1) to (5), the touch panel further includes a protective film which is formed on the plurality of first electrodes and the plurality of second electrodes.

(7) In the display device with a touch panel having the above-mentioned constitution (6), the touch panel has a front panel formed on the protective film.

(8) According to another aspect of the present invention, there is provided a display device with a touch panel which includes: a display panel; and an electrostatic-capacitance-coupling touch panel which is arranged on a viewer-side surface of the display panel, wherein the touch panel includes: a substrate; a plurality of first electrodes which are formed on a display-panel-side surface of the substrate, extend in the first direction and are arranged parallel to each other in the second direction which intersects with the first direction; a plurality of second electrodes which are formed on the display-panel-side surface of the substrate, extend in the second direction and are arranged parallel to each other in the first direction which intersects with the second direction; an insulation film which is formed on the plurality of first electrodes and the plurality of second electrodes; and a shield conductor which is formed on the insulation film; wherein a predetermined signal is inputted to the shield conductor, each one of the plurality of first electrodes includes a first portion which is formed on the insulation film and the second portion which is formed in a separated manner from the second electrode on the display-panel-side surface of the substrate, the first portion is connected to the second portion via a contact hole formed in the insulation film, the shield conductor has a plurality of opening portions, the plurality of opening portions include first opening portions in which the first portions are formed in openings and second opening portions in which the first portions are not formed in the openings, and the first portions are formed in the first opening portions.

(9) In the display device with a touch panel having the above-mentioned constitution (8), the shield conductor has a meshed shape constituted of first members and second members which intersect with each other, and the first opening portions and the second opening portions are respectively opening portions which are formed by the first members and the second members which constitute the meshed shape.

(10) In the display device with a touch panel having the above-mentioned constitution (9), the second electrode has first portions which intersect with the first portions of the first electrode in plane and second portions which are contiguously formed with the first portions, the second portion of the first electrode has a planar square shape in which a width of the second portion of the first electrode is larger than a width of the first portion of the first electrode, the second portion of the second electrode has a planar square shape in which a width of the second portion of the second electrode is larger than a width of the first portion of the second electrode, the second portion of the first electrode and the second portion of the second electrode are arranged in a state where a side of the second portion of the first electrode and a side of the second portion of the second electrode which face each other in an opposed manner make an acute angle with respect to the first direction, and the first member and the second member of the shield conductor which constitute the meshed shape are formed along the side of the second portion of the first electrode and along the side of the second portion of the second electrode which face each other in an opposed manner.

(11) In the display device with a touch panel having the above-mentioned constitution (10), at least one of the first members and at least one of the second members of the shield conductor are arranged between the first portions of two first electrodes arranged adjacent to each other.

(12) In the display device with a touch panel having the above-mentioned constitution (8), the display device further includes a plurality of lines which are formed around a region where the plurality of first electrodes and the plurality of second electrodes are formed, and are electrically connected to the plurality of first electrodes or the plurality of second electrodes respectively, the plurality of lines are formed on the display-panel-side surface of the substrate, and the shield conductor is formed so as to cover the plurality of lines.

(13) In the display device with a touch panel having any one of the above-mentioned constitutions (8) to (12), the touch panel further includes a protective film which is formed on the plurality of first electrodes and the plurality of second electrodes.

(14) In the display device with a touch panel having any one of the above-mentioned constitutions (1) to (13), the plurality of first electrodes and the plurality of second electrodes are formed of a transparent conductive film.

To briefly explain advantageous effects obtained by typical inventions among the inventions described in this specification, they are as follows.

According to the present inventions, it is possible to realize the suppression of lowering of characteristics and the reduction of cost in a display device with a touch panel.

BRIEF DESCRIPTION OF THE DRAWINGS

FIG. 3A and FIG. 3B are views showing the cross-sectional structure of the touch panel shown in FIG. 1, wherein FIG. 3A is a cross-sectional view taken along a line A-A' in FIG. 1, and FIG. 3B is a cross-sectional view showing a portion of the touch panel shown in FIG. 3A in an enlarged manner;

FIG. 4A and FIG. 4B are views showing the cross-sectional structure of the touch panel shown in FIG. 1, wherein FIG. 4A is a cross-sectional view taken along a line B-B' in FIG. 1, and FIG. 4B is a cross-sectional view showing a portion of the touch panel shown in FIG. 4A in an enlarged manner;

FIG. 10A and FIG. 10B are views showing the cross-sectional structure of the touch panel shown in FIG. 8, wherein FIG. 10A is a cross-sectional view taken along a line D-D' in FIG. 8, and FIG. 10B is a cross-sectional view showing a portion of the touch panel shown in FIG. 10A in an enlarged manner;

FIG. 11A and FIG. 11B are views showing the cross-sectional structure of the touch panel shown in FIG. 8, wherein FIG. 11A is a cross-sectional view taken along a line E-E' in FIG. 8, and FIG. 11B is a cross-sectional view showing a portion of the touch panel shown in FIG. 11A in an enlarged manner;

DESCRIPTION OF THE PREFERRED EMBODIMENTS

Hereinafter, embodiments of the present invention are explained in detail in conjunction with drawings. Here, in all drawings for explaining the embodiments of the present invention, parts having identical functions are given same symbols, and their repeated explanation is omitted.

Embodiment 1

In this embodiment 1, the explanation is made with respect to a case in which the present invention is applied to, for example, a display device with a touch panel which mounts a touch panel on a liquid crystal display panel as one example of a display panel.

Figure 1:
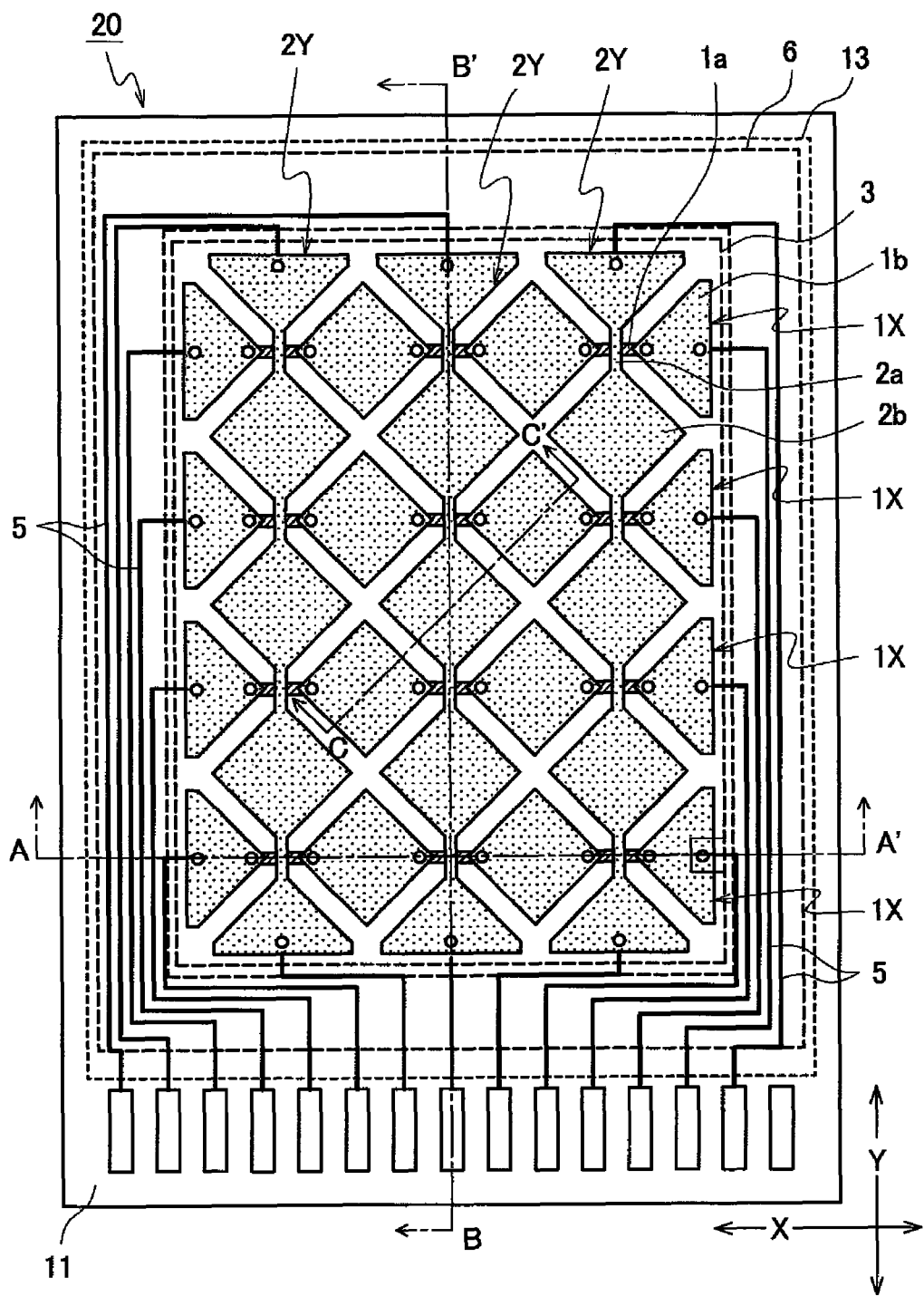
FIG. 1 is a plan view showing an electrode pattern of a touch panel which is incorporated into a display device with a touch panel according to an embodiment 1 of the present invention.
Figure 2:
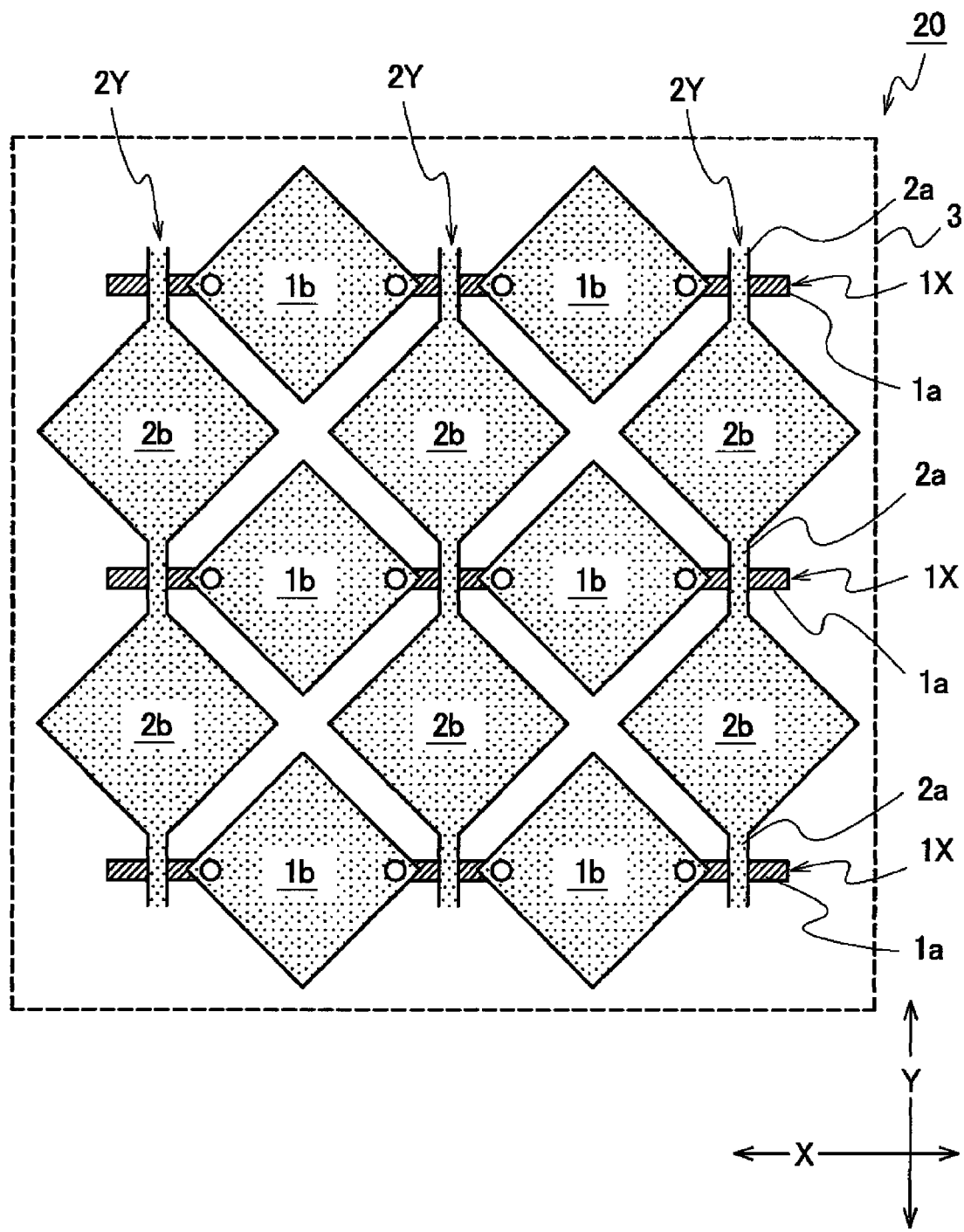
FIG. 2 is a plan view showing a portion of the electrode pattern shown in FIG. 1 in an enlarged manner.
Figure 5:
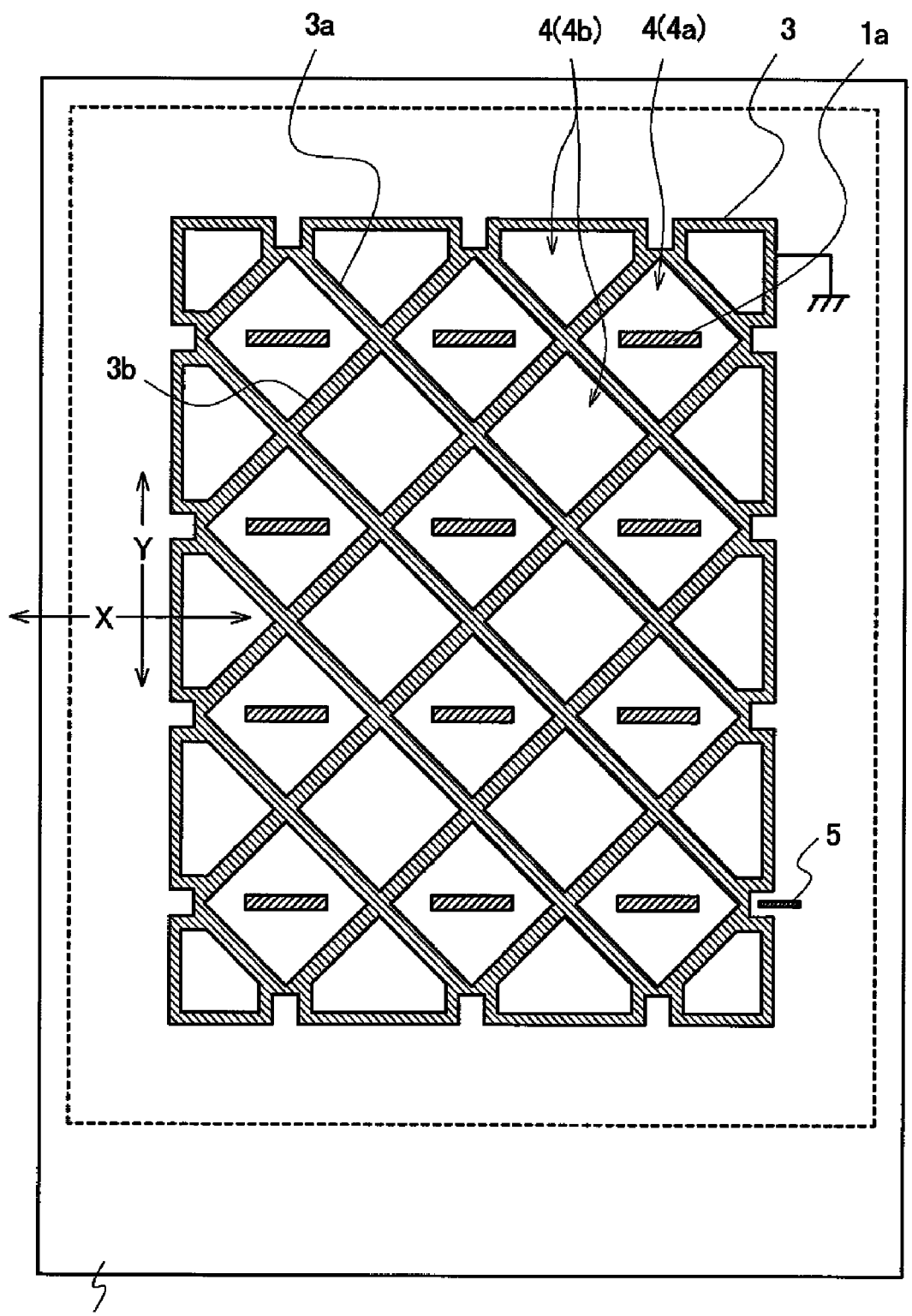
FIG. 5 is a plan view showing a shield conductor pattern in the touch panel shown in FIG. 1.
Figure 6:
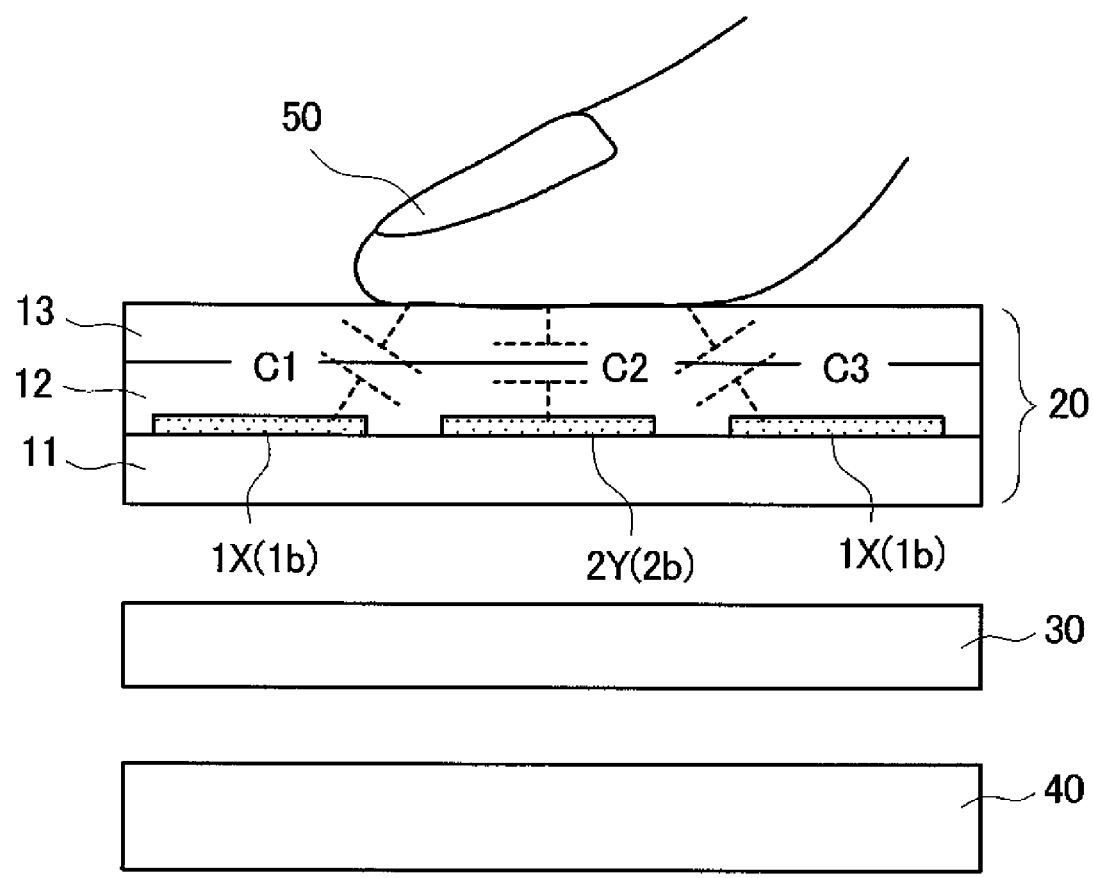
FIG. 6 is a block diagram showing the schematic constitution of the display device with a touch panel according to the embodiment 1 of the present invention.

FIG. 1 to FIG. 6 are views according to the display device with a touch panel of an embodiment 1 of the present invention. That is, FIG. 1 is a plan view showing an electrode pattern of a touch panel which is incorporated into the display device with a touch panel, FIG. 2 is a plan view showing a portion of the electrode pattern shown in FIG. 1 in an enlarged manner, FIG. 3A and FIG. 3B are views showing the cross-sectional structure of the touch panel shown in FIG. 1, wherein FIG. 3A is a cross-sectional view taken along a line A-A' in FIG. 1, and FIG. 3B is a cross-sectional view showing a portion of the touch panel shown in FIG. 3A in an enlarged manner, FIG. 4A and FIG. 4B are views showing the cross-sectional structure of the touch panel shown in FIG. 1, wherein FIG. 4A is a cross-sectional view taken along a line B-B' in FIG. 1, and FIG. 4B is a cross-sectional view showing a portion of the touch panel shown in FIG. 4A in an enlarged manner, FIG. 5 is a plan view showing a shield conductor pattern in the touch panel shown in FIG. 1, and FIG. 6 is a block diagram showing the schematic constitution of the display device with a touch panel.

FIG. 6 shows the cross-sectional structure of the touch panel 20 taken along a line C-C' in FIG. 1.

The display device with a touch panel of this embodiment 1 includes, as shown in FIG. 6, a liquid crystal display panel 30, an electrostatic-capacitance-coupling touch panel 20 which is arranged on a viewer-side surface of the liquid crystal display panel 30, and a backlight 40 which is arranged below a surface of the liquid crystal display panel 30 on a side opposite to the viewer's side. As the liquid crystal display panel 30, an IPS type liquid crystal display panel, a TN type liquid crystal display panel, a VA type liquid crystal display panel or the like may be used, for example. The liquid crystal display panel 30 includes a display region where a plurality of pixels are arranged in a matrix array, and a non-display region which is arranged around the display region. Each of the plurality of pixels includes a pixel electrode and a counter electrode. A light blocking film such as a black matrix is formed in the non-display region.

The touch panel 20 includes, as shown in FIG. 1 to FIG. 4, a plurality of electrodes 1X which respectively extend in the first direction (for example, X direction) and are arranged parallel to each other in the second direction (for example, Y direction) which intersects with the first direction at predetermined pitches on a viewer-side surface of a substrate 11, and a plurality of electrodes 2Y which respectively extend in the second direction by intersecting with the plurality of electrodes 1X and are arranged parallel to each other in the first direction at predetermined pitches on the viewer-side surface of a substrate.

Each one of the plurality of electrodes 2Y is formed in an electrode pattern where a plurality of first portions 2a and a plurality of second portions 2b each having a width larger than a width of the first portion 2a are alternately arranged in the second direction. The plurality of respective electrodes 2Y are arranged on the viewer-side surface of the substrate 11 by way of an insulation film 12, and are covered with a protective film 13 formed over the electrodes 2Y. As the substrate 11, a transparent insulation substrate made of glass or the like is used, for example.

Each one of the plurality of electrodes 1X is formed in an electrode pattern where a plurality of first portions 1a and a plurality of second portions 1b each having a width larger than a width of the first portion 1a are alternately arranged in the first direction. The first portion 1a of each one of the plurality of electrodes 1X is formed on a conductive layer different from a conductive layer on which the electrodes 2Y are formed, and intersects with the first portion 2a of the electrodes 2Y in plane. The second portion 1b of each one of the plurality of electrodes 1X is formed in a separated manner from the electrode 2Y and on the same conductive layer as the electrode 2Y. In this embodiment 1, the first portion 1a of the electrode 1X is formed below the electrode 2Y as viewed from a substrate 11 side.

The second portions 1b of plurality of respective electrodes 1X are, in the same manner as the electrode 2Y, arranged on the viewer-side surface of the substrate 11 by way of the insulation film 12, and the second portions 1b are covered with the protective film 13 formed on the second portions 1b. The first portions 1a of the plurality of respective electrodes 1X are arranged on the viewer-side surface of the substrate 11 and are covered with the insulation film 12 formed on the first portions 1a.

The first portion 1a of the electrode 1X intersects with the first portion 2a of the electrode 2Y in plane. The first portion 1a of the electrode 1X is electrically and mechanically connected to two second portions 1b arranged adjacent to each other with the first portion 2a sandwiched therebetween via a contact hole 12a formed in the insulation film 12 which constitutes an interlayer insulation film between the first portion a of the electrode 1X and the electrode 2Y.

That is, each one of the plurality of electrodes 1X includes the first portions 1a which are formed on the conductive layer different from the conductive layer for forming the electrode 2Y and intersect with the electrode 2Y, and the second portions 1b which are formed in a separated manner from the electrode 2Y and are formed on the same conductive layer as the electrode 2Y. The first portion 1a of the electrode 1X is electrically connected to the second portion 1b of the electrode 1X via the contact hole 12a formed in the insulation film 12 between the first portion 1a and the electrode 2Y.

The second portion 2b of the electrode 2Y is arranged between the first portions 1a of two electrodes 1X arranged adjacent to each other as viewed in a plan view. The second portion 1b of the electrode 1X is arranged between the first portions 2a of two electrodes 2Y arranged adjacent to each other as viewed in a plan view.

That is, the electrode 2Y includes the portion 2b having a width larger than a width of the portion 2a where the electrode 2Y intersects with the electrode 1X between the electrodes 1X, and the electrode 1X includes the portion 1b having a width larger than a width of the portion 1a where the electrode 1X intersects with the electrode 2Y between the electrodes 2Y.

The touch panel 20 includes, as viewed in a plan view, a center region where the plurality of electrodes 2Y and the plurality of electrodes 1X are arranged, and a peripheral region which is arranged around the center region. On a peripheral region of the touch panel 20, as shown in FIG. 1, a plurality of lines 5 which are electrically connected to the plurality of electrodes 2Y respectively and a plurality of lines 5 which are electrically connected to the plurality of electrodes 1X respectively are arranged. The plurality of these lines 5 are lines which electrically connect the plurality of respective electrodes 2Y and the plurality of respective electrodes 1X with a touch position control circuit.

The center region of the touch panel 20 is arranged corresponding to the display region of the liquid crystal display panel 30, and the peripheral region of the touch panel 20 is arranged corresponding to the non-display region of the liquid crystal display panel 30. That is, the plurality of electrodes 1X and the plurality of electrodes 2Y of the touch panel 20 are arranged in the region which faces the display region of the liquid crystal display panel 30 in an opposed manner, and the plurality of lines 5 are arranged in the region which faces the non-display region of the liquid crystal display panel 30 in an opposed manner.

As shown in FIG. 3 and FIG. 4, the plurality of respective lines 5 are arranged on the viewer-side surface (main surface) of the substrate 11, and the plurality of lines 5 are covered with the insulation film 12 formed over the lines 5. As shown in FIG. 3 and FIG. 4, the plurality of respective lines 5 are electrically connected to the corresponding electrodes (electrodes 1X, electrodes 2Y) via the contact holes 12b formed in the insulation film 12 at terminal end portions of the respective electrodes (electrodes 1X, electrodes 2X).

The plurality of respective electrodes 1X and the plurality of respective electrodes 2Y are formed using a material which exhibits high transmissivity, for example, a transparent conductive material such as ITO (Indium Tin Oxide). Each one of the plurality of lines 5 adopts the two-layered structure where respective layers are made of different conductive materials, for example. For example, each electrode adopts the two-layered structure which is constituted of a transparent conductive film (for example, ITO film) formed on the same layer as the first portion 1a of the electrode 1X, and a conductive metal film which is formed on the transparent conductive film and exhibits a resistance value smaller than a resistance value of the transparent conductive film.

The touch panel 20 includes a shield conductor 3 as shown in FIG. 1 to FIG. 5. The shield conductor 3 is arranged on the viewer-side surface (main surface) of the substrate 11, and is covered with the insulation film 12 formed over the shield conductor 3.

The shield conductor 3 is formed on the same layer as the first portions 1a of the electrodes 1X, and is formed using a material which exhibits high transmissivity, for example, a transparent conductive material such as ITO (Indium Tin oxide). The first portions 1a of the plurality of electrodes 1X and the shield conductor 3 are formed by patterning the same conductive film.

As viewed in a plan view, the shield conductor 3 is arranged in the center region of the touch panel 20 such that the shield conductor 3 covers the plurality of electrodes (electrodes 1X, electrodes 2Y). As shown in FIG. 3 to FIG. 5, the shield conductor 3 has a plurality of opening portions 4. The plurality of opening portions 4 include opening portions 4a where the first portions 1a of the electrodes 1X are arranged in openings, and opening portions 1b where the first portions 1a of the electrodes 1X are not arranged in the openings. The first portions 1a of the electrodes 1X are formed within the opening portions 4a of the shield conductor 3. That is, the shield conductor 3 of this embodiment 1 are formed in a separated manner from the first portions 1a of the electrodes 1X and on the same conductive layer as the first portions 1a of the electrodes 1X.

In this embodiment 1, the shield conductor 3 has a meshed shape and is constituted of, for example, a plurality of members 3a which respectively extend in the third direction and are arranged parallel to each other in the fourth direction orthogonal to the third direction at predetermined pitches, and a plurality of members 3b which respectively extend in the fourth direction which intersects with the third direction and are arranged parallel to each other in the third direction at predetermined pitches. The opening portions 4a and the opening portions 4b are respectively openings which are formed by the members 3a and the members 3b arranged in a meshed shape.

In this embodiment 1, with respect to planar shapes of the second portions (1b, 2b) of the respective electrodes 1X and 1Y, as shown in FIG. 1 and FIG. 2, the second portions (1b, 2b) of the electrodes 1X and 1Y have a square shape where the widths of these second portions (1b, 2b) are set larger than widths of the first portions (1a, 2a) of the electrodes 1X and 1Y, for example. The second portion 1b of the electrode 1X and the second portion 2b of the electrode 2Y are arranged in a state where a side of the second portion 1b and a side of the second portion 2b which face each other make an acute angle with respect to the above-mentioned first direction (for example, X direction) (an inclined state). Accordingly, as shown in FIG. 5, the shield conductor 3 has a meshed shape where one member 3a and the other member 3b are arranged along the sides of the second portion 1b of the electrode 1X and the sides of the second portion 2b of the electrode 2Y which face each other in an opposed manner respectively. The second portion 1b of the electrode 1X and the second portion 2b of the electrode 2Y are arranged in a state where the side of the second portion 1b and the side of the second portion 2b which face each other in an opposed manner make an angle of 45 degrees, for example, with respect to the first direction (X direction) (inclined state). One member 3a which constitutes the mesh shape extends at an angle of 45 degrees in the clockwise direction with respect to the first direction (X direction), for example, and the other member 3b which constitutes the mesh shape extends at an angle of 45 degrees in the counterclockwise direction with respect to the first direction (X direction), for example.

In this embodiment 1, the shield conductor 3 adopts the shape where one piece of one member 3a and one piece of the other member 3b which constitute the meshed shape are arranged between the first portions 1a of two electrodes 1X arranged adjacent to each other, that is, the shape where one member 3a and the other member 3b which constitute the meshed shape traverse between the first portions 1a of the two electrodes 1X arranged adjacent to each other.

The touch panel 20 of this embodiment 1 is arranged on the liquid crystal display panel 30 such that a surface of the substrate 11 opposite to the viewer-side surface of the substrate 11 faces a viewer-side surface of the liquid crystal display panel 30 in an opposed manner. The shield conductor 3 is arranged between the liquid crystal display panel 30 and the center region of the touch panel 20 where the plurality of electrodes (electrodes 1X, electrodes 2Y) are arranged. A predetermined signal is inputted to the shield conductor 3 so that noises transmitted to the touch panel 20 from the liquid crystal display panel 30 can be reduced. The shield conductor 3 of this embodiment 1 is electrically connected to a line whose potential is fixed to a reference potential (for example, 0V), for example, out of power source potentials used in the display device with a touch panel.

The touch panel 20 includes a shield conductor 6 in addition to the shield conductor 3 as shown in FIG. 1 to FIG. 4. The shield conductor 6 is arranged on the insulation film 12, and is covered with the protective film 13 formed over the shield conductor 6.

The shield conductor 6 is formed on the same layer as the second portions 1b of the electrodes 1X and the electrodes 2Y, and is formed using a material which exhibits high transmissivity, for example, a transparent conductive material such as ITO (indium Tin oxide). The second portions 1b of the plurality of electrodes 1X, the plurality of electrodes 2Y and the shield conductor 6 are formed by patterning the same conductive film.

The shield conductor 6 is, as viewed in a plan view, arranged in the peripheral region of the touch panel 20 such that the shield conductor 6 covers the plurality of lines 5. The shield conductor 6 is formed in a separated manner from the second portions 1b of the electrodes 1X and the electrodes 2Y and on the same conductive layer as the second portions 1b of the electrodes 1X and the electrodes 2Y.

A predetermined signal is inputted to the shield conductor 6 so that noises transmitted to the touch panel 20 from the viewer's side can be reduced. The shield conductor 6 of this embodiment 1 is electrically connected to a line whose potential is fixed to a reference potential (for example, 0V), for example, out of power source potentials used in the display device with a touch panel.

FIG. 6 schematically shows a state where capacitances C1, C3 are generated between a finger 50 of a viewer and the electrodes 1X, and a capacitance C2 is generated between the finger 50 of the viewer and the electrode 2Y. The touch panel 20 of this embodiment detects the capacitance difference of coupled capacitance between the electrode 1X and the electrode 2Y, and detects touch position coordinates in a touch plane of the touch panel 20 which the finger 50 of the viewer touches.

Next, a manufacturing method of the touch panel 20 of this embodiment 1 is explained in conjunction with FIG. 1 to FIG. 5.

Firstly, a first transparent conductive film made of a transparent conductive material (for example, ITO) is formed on a viewer-side surface of the substrate 11.

Next, on the first transparent conductive film, a first mask which has an electrode pattern, a shield conductor pattern and a wiring pattern is formed using a positive resist, for example. Thereafter, by etching the first transparent conductive film using the first mask as an etching mask, the first portions 1a of the electrodes 1X, the shield conductor 3 and a wiring lower-layer pattern are formed on the substrate 11. The shield conductor 3 is configured to have a plurality of opening portions 4 including the opening portions 4a where the first portions 1a of the electrodes 1X are formed within the opening portions and a plurality of opening portions 4b where the first portions 1a of the electrodes 1X are not formed within the opening portions. The first portions 1a of the electrodes 1X are formed in the opening portions 4 of the shield conductor 3.

Next, the first mask is removed and, thereafter, on the above-mentioned wiring lower-layer pattern, a wiring upper-layer pattern made of a conductive metal material, for example, is selectively formed. Due to such steps, the lines 5 each having the two-layered structure consisting of the wiring lower-layer pattern and the wiring upper-layer pattern are formed.

Next, the insulation film 12 made of a negative resist, for example, is formed on the substrate 11 including an area on the shield conductor 3, areas on the first portions 1a of the electrodes 1X, and areas on the lines 5. In such a step, the shield conductor 3, the first portions 1a of the electrodes 1X, and the lines 5 are covered with the insulation film 12.

Next, the contact holes 12a and the contact holes 12b are formed in portions of the insulation film 12 in place and, thereafter, a second transparent conductive film made of a transparent conductive material (for example, ITO) is formed on the insulation film 12 including the inside of the contact holes 12a and the inside of the contact holes 12b.

Next, on the second transparent conductive film, a second mask which has an electrode pattern and a shield conductor pattern is formed using a positive resist, for example. Thereafter, by etching the second transparent conductive film using the second mask as an etching mask, the second portions 1b of the electrodes 1X, the electrodes 2Y and the shield conductor 6 are formed on the insulation film 12. In this step, the second portions 1b which are formed on the upper layer are electrically and mechanically connected to the first portions 1a which are formed on the lower layer via contact holes 12a. Further, the first portions 1a which are formed on the lower layer intersect with the first portions 2a of the electrodes 2Y which are formed on the upper layer. Further, the electrodes 1X and the electrodes 2Y have respective terminal ends thereof electrically and mechanically connected to the corresponding lines 5 which are formed on the lower layer via the contact holes 12b.

Next, the second mask is removed and, thereafter, the protective film 13 made of a negative resist, for example, is formed on the insulation film 12 including an area on the second portions 1b of the electrodes 1X, an area on the electrodes 2Y and an area on the shield conductor 6 thus providing the structure shown in FIG. 1 to FIG. 5. In this step, the second portions 1b of the electrodes 1X, the electrodes 2Y and the shield conductor 6 are covered with the protective film 13.

Figure 16:
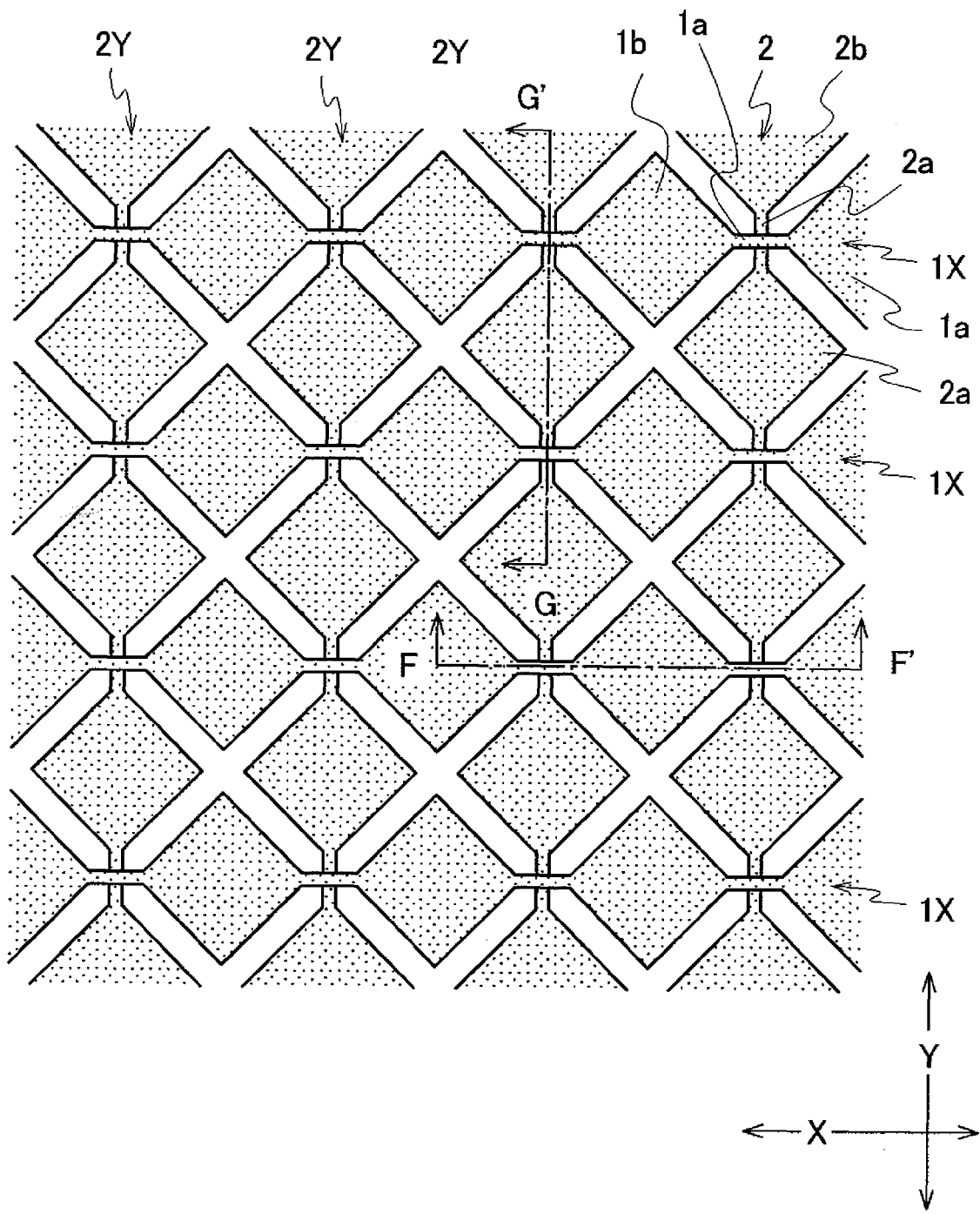
FIG. 16 is a plan view of an electrode pattern of a conventional electrostatic capacitance-coupling touch panel.
Figure 17:
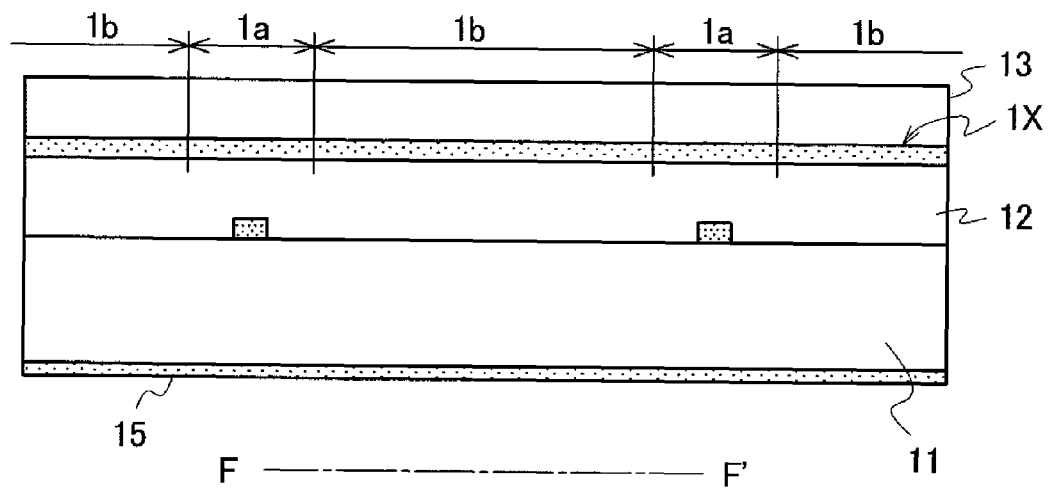
FIG. 17 is a cross-sectional view showing the cross-sectional structure taken along the line F-F' in FIG. 16.
Figure 18:
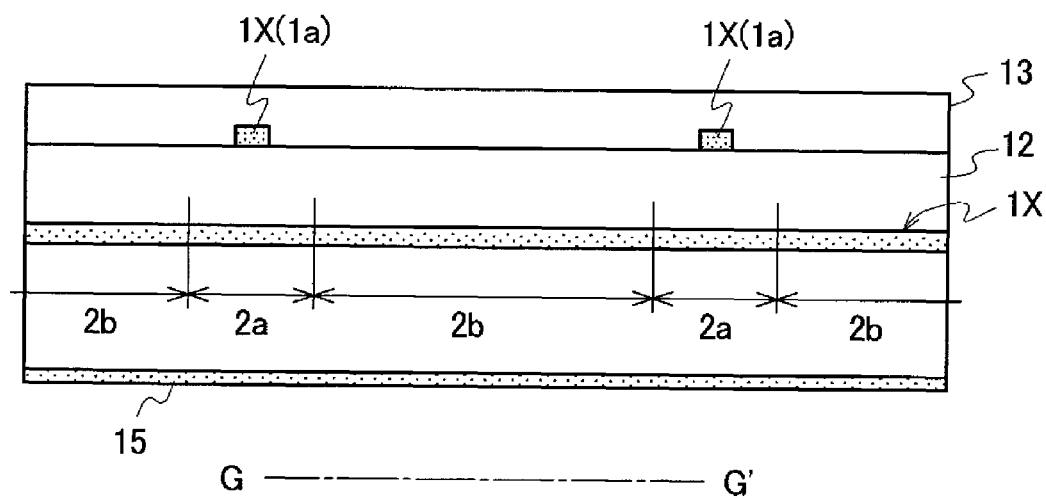
FIG. 18 is a cross-sectional view showing the cross-sectional structure taken along the line G-G' in FIG. 16.

In the conventional electrostatic-capacitance-coupling touch panel, as shown in FIG. 16 to FIG. 18, a plurality of electrodes 1X and a plurality of electrodes 2Y are formed on conductive layers (lower layer and upper layer) different from each other by way of the insulation film 12. In such electrode structure, with respect to the insulation film 12 and the protective film 13 which is formed on the electrodes 1X formed on the insulation film 12, strain is generated in these films due to the electrode 1X formed on the upper layer. Further, with respect to a reflection light, the lower layer and the upper layer have the different optical path lengths and hence, the color difference occurs between the electrodes 2Y formed on the lower layer and the electrodes 1X formed on the upper layer thus making electrode patterns of the electrodes 1X and the electrodes 2Y appear conspicuously.

To the contrary, in the electrostatic-capacitance-coupling touch panel 20 of this embodiment, as shown in FIG. 1 to FIG. 4, the electrode 1X includes the first portions 1a which are formed on the layer different from the second electrode 2Y in a state where the first portions of the electrode 1X intersect with the electrode 2Y, and the second portions 1b of the electrode 1X which are formed on the same layer as the electrode 2Y and are formed in a separated manner from the electrode 2Y. Further, the first portions 1a are connected to the second portions 1b via the contact holes 12a formed in the insulation film 12 between the first portions 1a and the electrodes 2Y.

In such electrode structure, it is possible to impart a uniform film forming surface to the protective film 13 and hence, it is possible to suppress the occurrence of strain in the protective film 13 thus suppressing the conspicuous appearance of the electrode pattern generated by the color difference attributed to strain in the protective film 13. As a result, worsening of the optical characteristic attributed to the conspicuous appearance of the electrode pattern can be suppressed thus suppressing lowering of characteristics of a display device in which the touch panel 20 is assembled.

Further, by minimizing portions where the color difference occurs, that is, by restricting the portions where the color difference occurs to only the first portions 1a of the electrodes 1X, the conspicuous appearance of the electrode pattern generated due to the color difference caused by the optical path difference can also be suppressed. As a result, worsening of the optical characteristic attributed to the conspicuous appearance of the electrode pattern can be suppressed thus suppressing the lowering of characteristics of a display device in which the touch panel 20 is assembled.

Further, in the conventional electrostatic-capacitance-coupling touch panel, as shown in FIG. 17 and FIG. 18, a shield conductor 15 is formed on a surface of a substrate 11 opposite to a viewer-side surface. In such structure, as transparent conductive material layers, it is necessary to provide three transparent conductive material layers consisting of the transparent conductive material layer for forming the electrodes 1X, the transparent conductive material layer for forming the electrodes 2Y and, further, the transparent conductive material layer for forming the shield conductor 15. This structure becomes a factor which impedes the reduction of cost.

To the contrary, according to the electrostatic-capacitance-coupling touch panel 20 of this embodiment, as shown in FIG. 1 to FIG. 5, the shield conductor 3 is formed of the transparent conductive film formed on the same layer as the first portions 1a of the electrodes 1X. Further, the shield conductor 3 includes the opening portions 4a in regions where the first portions 1a of the electrodes 1X are formed, and the first portions 1a of the electrodes 1X are formed in the opening portions 4a formed in the shield conductor 3.

Due to such electrode structure, the electrodes 1X, the electrodes 2Y and the shield conductor 3 which is provided for reducing noises transmitted from the liquid crystal display panel 30 to the touch panel 20 can be formed of two transparent conductive material layers. Accordingly, compared to the conventional touch panel, materials and processes for forming the transparent conductive material layers can be saved and hence, it is possible to manufacture the touch panel at a lower cost. Due to the lowering of the manufacturing cost of the touch panel, a cost for manufacturing the display device with a touch panel in which the touch panel is incorporated can be lowered.

Further, the touch panel 20 of this embodiment 1 includes, as shown in FIG. 1 to FIG. 4, the shield conductor 6 which is formed on the insulation film 12 so as to cover the plurality of lines 5 and to which a predetermined signal is inputted. In this embodiment, 0V is inputted to the shield conductor. A kind of signal to be inputted to the conductor used for shielding does not limit the gist of the present invention and other kinds of signals may be used. The shield conductor 6 is formed on the same transparent conductive layer as the first portions 1a of the electrodes 1X and the electrodes 2Y. Due to such structure, it is possible to reduce noises transmitted to the touch panel from the viewer's side by the shield conductor 6. Further, the electrodes 1X, the electrodes 2Y and the shield conductor 6 provided for reducing noises transmitted to the touch panel from the viewer's side can be formed of two transparent conductive material layers and hence, the touch panel can be manufactured at a low cost.

As described above, by providing the shield conductor 3 between the substrate 11 and the electrodes 1X and the electrodes 2Y, it is possible to reduce noises transmitted to the touch panel 20 from the liquid crystal display panel 30. However, a distance between the electrodes 1X and the electrodes 2Y and the shield conductor 3 is only approximately several μm and hence, capacitance is generated between the electrode 1X and the electrode 2Y and the shield conductor 3. This capacitance adversely effects an operation of the electrostatic-capacitance-coupling touch panel and hence, it is desirable to reduce the capacitance to a minimum value.

In view of the above, the shield conductor 3 of this embodiment 1 includes the opening portions 4a where the first portions 1a of the electrodes 1X are formed in the openings thereof. Further, in addition to these opening portions 4a, the shield conductor 3 of this embodiment 1 also includes opening portions 4b where the first portions 1a of the electrodes 1X are not formed in the openings thereof. Due to such conductor structure, the capacitance generated between the electrode 1X and the electrode 2Y and the shield conductor 3 can be reduced thus providing the highly reliable display device with a touch panel which exhibits the excellent noise resistance at a low cost.

The capacitance generated between the electrodes 1X and the electrodes 2Y and the shield conductor 3 is decreased along with the increase of the number and size of the opening portions 4b where the first portion 1a of the electrode 1X is not formed in the opening, that is, along with the increase of a non-conductive region per unit area. However, a trade-off relationship is established between the capacitance generated between the electrodes 1X and the electrodes 2Y and the shield conductor 3 and a shielding effect. Accordingly, it is desirable to decide the number and size of the opening portions 4b by taking a shielding effect into consideration. The number and size of the opening portions 4b can be defined by the number of one members and the other members (3a, 3b) constituting a meshed shape which traverse between the first portions 1a of two electrodes 1X arranged adjacent to each other (the number of one members and the other members (3a, 3b) constituting the meshed shape which are arranged between the first portions 1a of two electrodes 1X arranged adjacent to each other). Accordingly, it is desirable to form the shield conductor 3 in a meshed shape where, as shown in the embodiment 1, at least one piece of one member and at least one piece of the other member (3a, 3b) intersect with each other between the first portions 1a of two electrodes 1X arranged adjacent to each other (in a meshed shape where at least one piece of one member and at least one piece of the other member (3a, 3b) which intersect with each other are arranged between the first portions 1a of two electrodes 1X arranged adjacent to each other).

Figure 7:
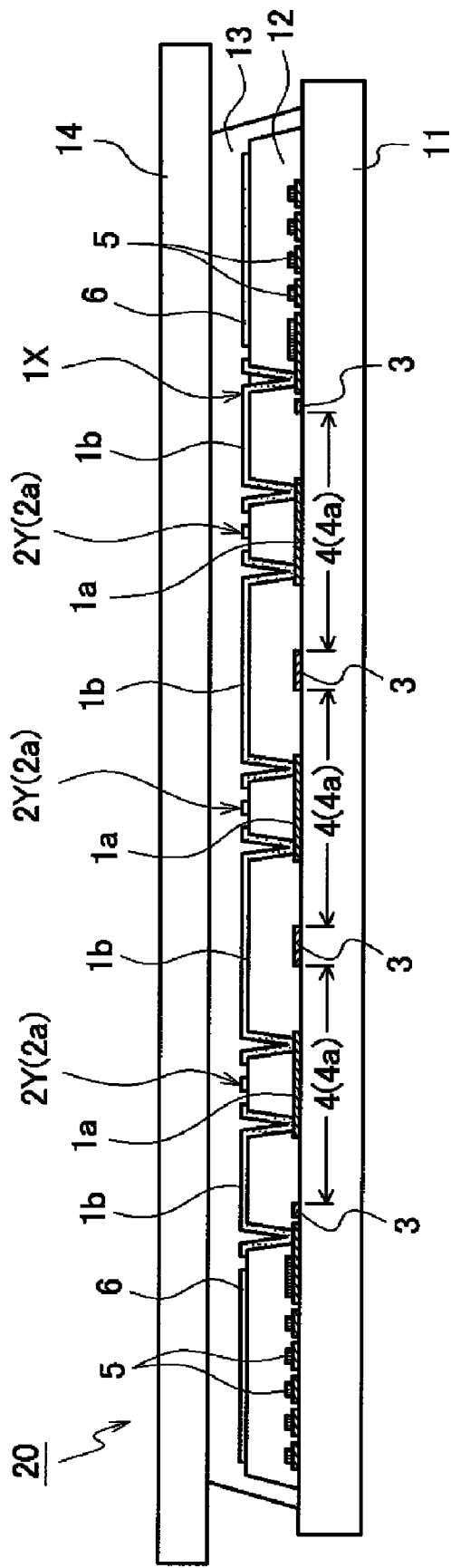
FIG. 7 is a cross-sectional view showing the cross-sectional structure of a touch panel according to a modification of the embodiment 1 of the present invention.

FIG. 7 is a cross-sectional view showing the cross-sectional structure of a touch panel according to a modification of the embodiment 1 of the present invention.

The touch panel 20 according to this modification basically has the substantially same constitution as the above-mentioned embodiment 1 and differs from the embodiment 1 with respect to the following constitution.

That is, as shown in FIG. 7, the touch panel 20 of this modification includes a front panel 14 which is formed on a protective film 13. The touch panel 20 having such constitution can also acquire the substantially equal advantageous effects as the above-mentioned embodiment 1.

Embodiment 2

Figure 8:
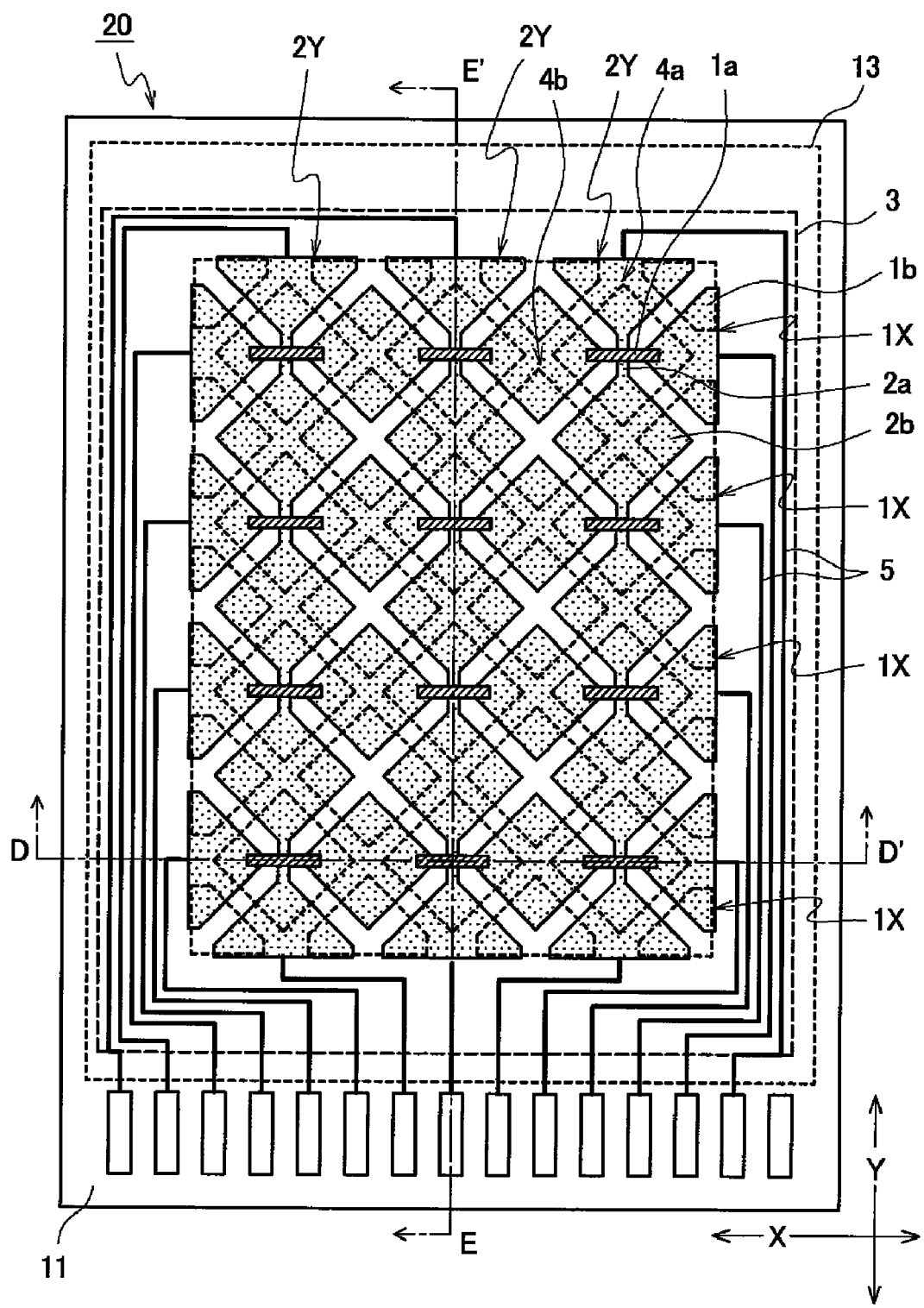
FIG. 8 is a plan view showing an electrode pattern of a touch panel which is incorporated into a display device with a touch panel according to an embodiment 2 of the present invention.
Figure 9:
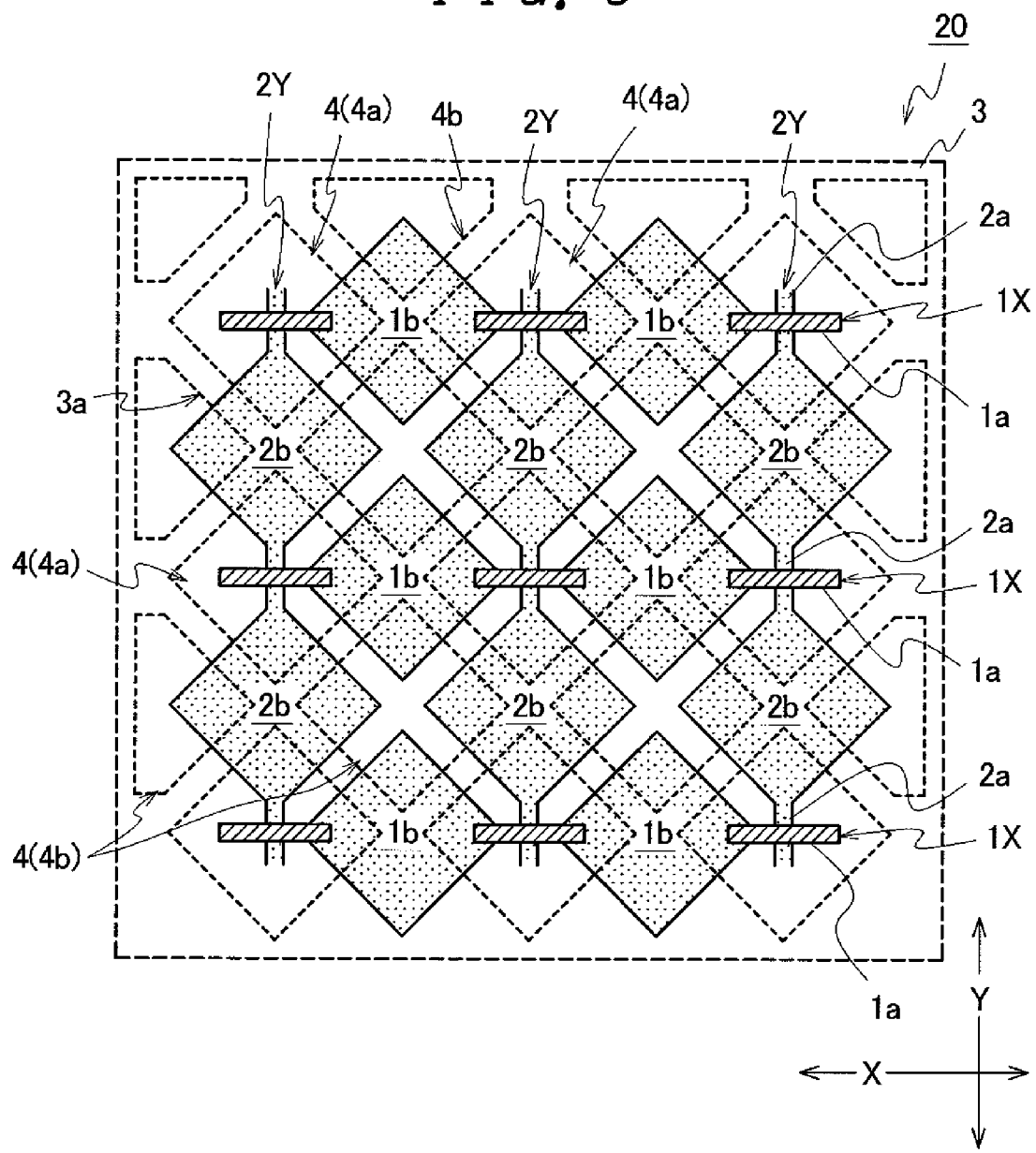
FIG. 9 is a plan view showing a portion of the display device with a touch panel shown in FIG. 8 in an enlarged manner.
Figure 10:
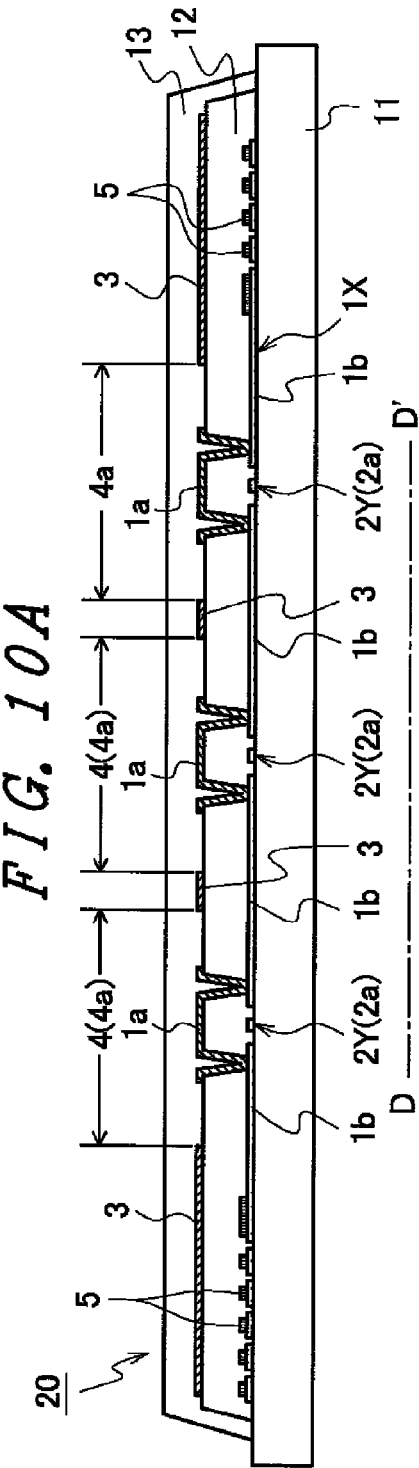
Figure 11:
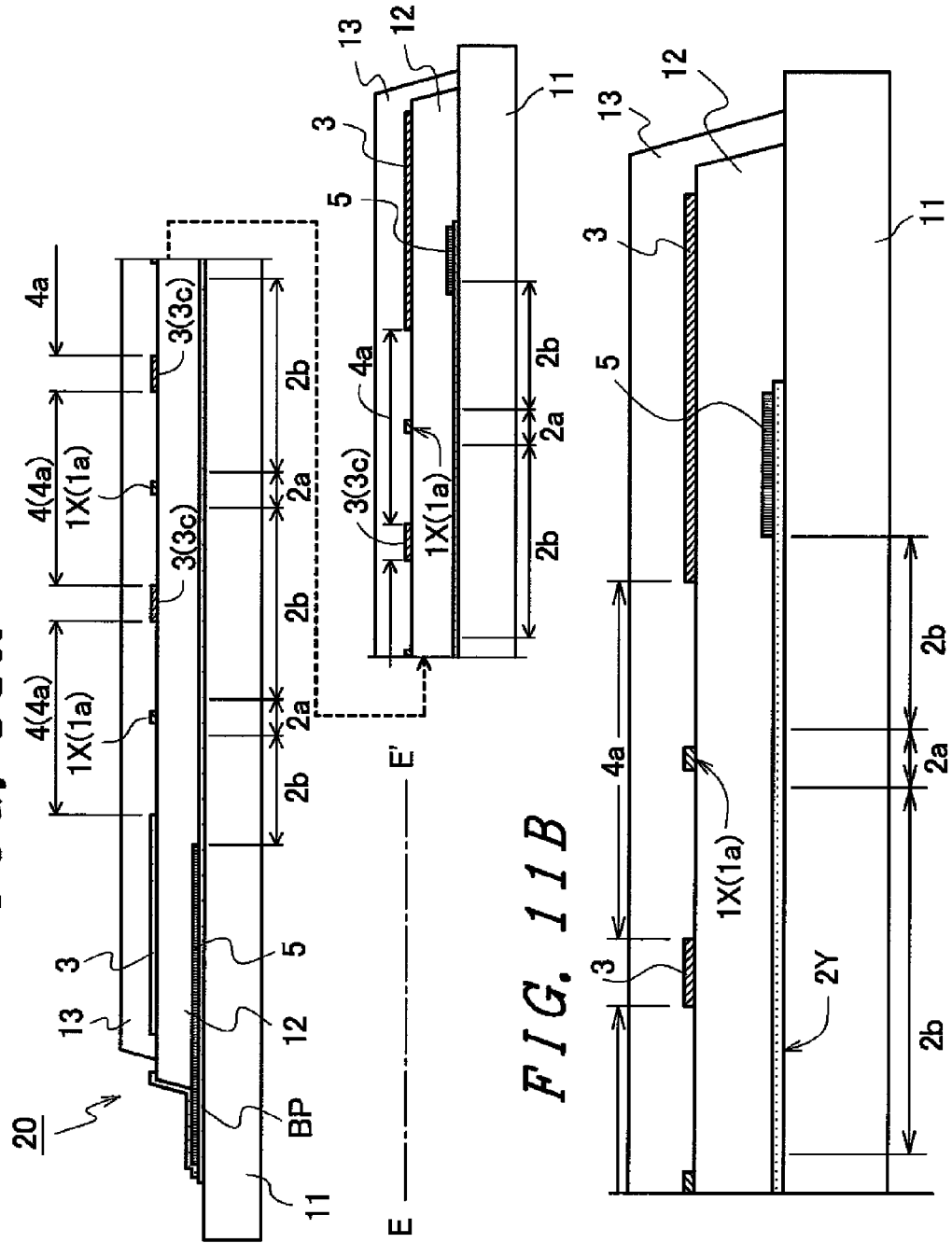
Figure 12:
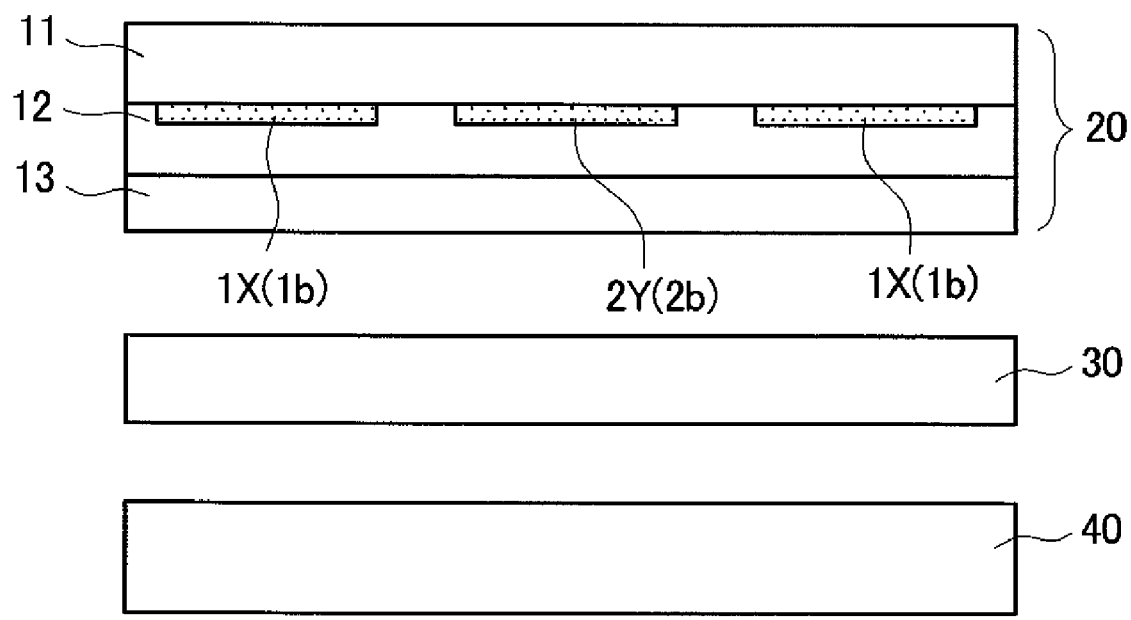
FIG. 12 is a block diagram showing the schematic constitution of the display device with a touch panel according to the embodiment 2 of the present invention.

FIG. 8 to FIG. 12 are views showing a display device with a touch panel according to the embodiment 2 of the present invention. That is, FIG. 8 is a plan view showing an electrode pattern of a touch panel which is incorporated into a display device with a touch panel according to the embodiment 2 of the present invention. FIG. 9 is a plan view showing a portion of the display device with a touch panel shown in FIG. 8 in an enlarged manner. FIG. 10A to FIG. 10B are views showing the cross-sectional structure of the touch panel shown in FIG. 8, wherein FIG. 10A is a cross-sectional view taken along a line D-D' in FIG. 8, and FIG. 10B is a cross-sectional view showing a portion of the touch panel shown in FIG. 8A in an enlarged manner. FIG. 11A to FIG. 11B are views showing the cross-sectional structure of the touch panel shown in FIG. 8, wherein FIG. 11A is a cross-sectional view taken along a line E-E' in FIG. 8, and FIG. 11B is a cross-sectional view showing a portion of the touch panel shown in FIG. 8A in an enlarged manner. FIG. 12 is a block diagram showing the schematic constitution of the display device with a touch panel according to the embodiment 2 of the present invention.

The display device with a touch panel according to the embodiment 2 basically has the substantially same constitution as the above-mentioned embodiment 1 and differs from the embodiment 1 with respect to the following constitution.

That is, in the above-mentioned embodiment 1, as shown in FIG. 1 to FIG. 4, the explanation has been made with respect to the example where the first portions 1a of the electrodes 1X and the shield conductor 3 are formed on the conductive layer which constitutes the lower layer, and the second portions 1b of the electrodes 1X, the electrodes 2Y and the shield conductor 6 are formed on the conductive layer formed above these components. In this embodiment 2, as shown in FIG. 8 to FIG. 11, the second portions 1b of the electrodes 1X and the electrodes 2Y (2a, 2b) are formed on the conductive layer which constitutes the lower layer, and the first portions 1a of the electrodes 1X and the shield conductor 3 are formed on the conductive layer formed above these components.

The second portions 1b of the plurality of respective electrodes 1X, the plurality of electrodes 2Y and the plurality of lines 5 are formed on a main surface of the substrate 1, and these components are covered with an insulation film 12 formed above these components. The first portions 1a of the plurality of respective electrodes 1X and the shield conductor 3 are formed on the insulation film 12 and are covered with a protective film 13 formed above these components.

The first portions 1a (upper layer in this embodiment) of the electrodes 1X intersect with the first portions 2a of the electrodes 2Y in plane. The first portions 1a of the electrodes 1X are electrically and mechanically connected to two second portions 1b (lower layer in this embodiment) arranged adjacent to each other with the first portions 2a sandwiched therebetween via the contact holes 12a formed in the insulation film 12 respectively. Here, the insulation film 12 constitutes an interlayer insulation film formed between the first portions 1a of the electrodes 1X and the electrodes 2Y.

The shield conductor 3 is formed in a center region and a peripheral region of the touch panel 20 such that the shield conductor 3 covers the second portions 1b of the plurality of respective electrodes 1X, the plurality of electrodes 2Y and the plurality of lines 5.

As shown in FIG. 12, the touch panel 20 of this embodiment 2 is arranged on the liquid crystal display panel 30 in a state where a protective-film-13-side surface of the substrate 11 face a viewer-side surface of the liquid crystal display panel 30, and the shield conductor 3 is arranged between the liquid crystal display panel 30 and the center region and the peripheral region of the touch panel 20. A predetermined signal is inputted to the shield conductor 3 so as to reduce noises transmitted to the touch panel 20 from the liquid crystal display panel 30.

Also in this embodiment 2, the conspicuous appearance of the electrode pattern generated due to the color difference caused by strain in the protective film 13 and the conspicuous appearance of the electrode pattern generated due to the color difference caused by optical path difference can be suppressed. As a result, worsening of the optical characteristic attributed to the conspicuous appearance of the electrode pattern can be suppressed thus suppressing the lowering of characteristics of a display device in which the touch panel 20 is assembled.

Further, the electrodes 1X, the electrodes 2Y and the shield conductor 3 which reduces noises from the liquid crystal display panel 30 to the touch panel 20 can be formed of two transparent conductive material layers. Accordingly, compared to the conventional touch panel, materials and processes for forming the transparent conductive material layers can be saved and hence, it is possible to manufacture the touch panel at a lower cost. Due to the lowering of the manufacturing cost of the touch panel, a cost for manufacturing the display device with a touch panel in which the touch panel is incorporated can be lowered.

The shield conductor 3 of the embodiment 2 also includes the opening portions 4a where the first portions 1a of the electrodes 1X are formed in the openings thereof in the same manner as the above-mentioned embodiment 1. Further, in addition to these opening portions 4a, the shield conductor 3 of this embodiment 2 also includes opening portions 4b where the first portions 1a of the electrodes 1X are not formed in the openings thereof. Also in this embodiment 2, in the same manner as the above-mentioned embodiment 1, the capacitance generated between the electrode 1X and the electrode 2Y and the shield conductor 3 can be reduced thus providing the highly reliable display device with a touch panel which exhibits the excellent noise resistance at a low cost.

Embodiment 3

Figure 13:
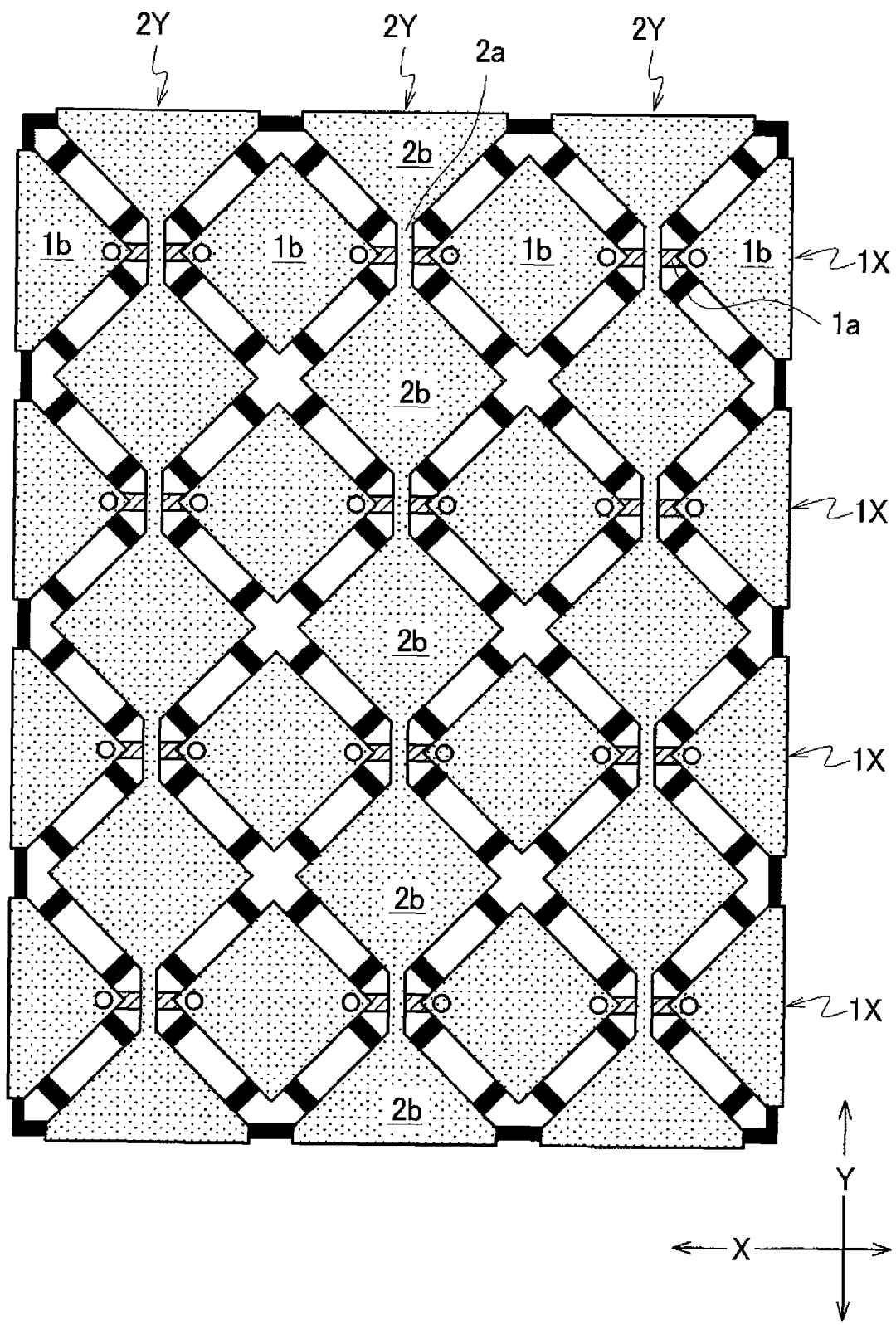
FIG. 13 is a plan view showing an electrode pattern of a touch panel which is incorporated into a display device with a touch panel according to an embodiment 3 of the present invention.
Figure 14:
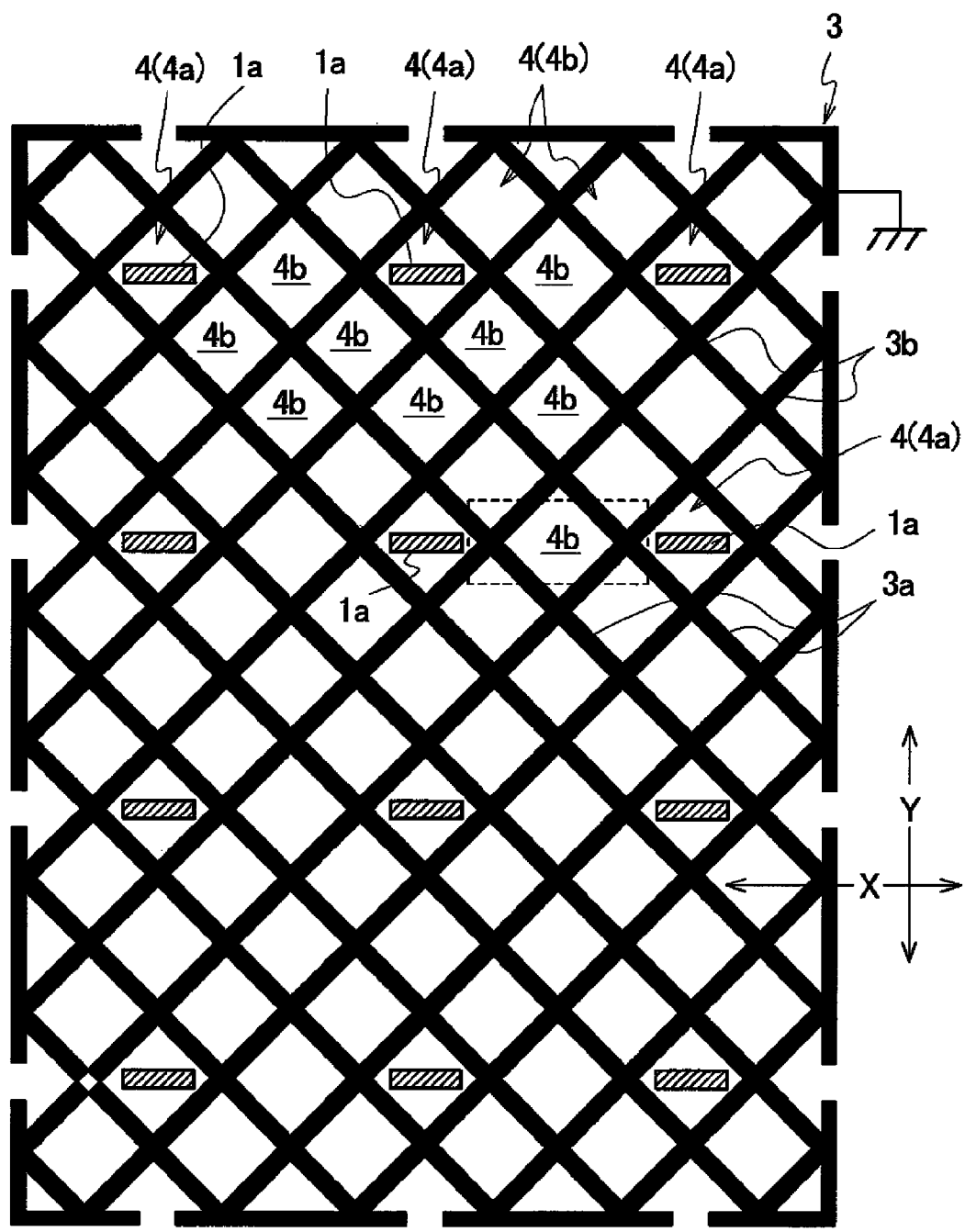
FIG. 14 is a plan view showing a shield conductor pattern in the touch panel shown in FIG. 13.

FIG. 13 and FIG. 14 are views showing a touch panel incorporated into a display device with a touch panel according to the embodiment 3 of the present invention. FIG. 13 is a plan view showing an electrode pattern of the touch panel, and FIG. 14 is a plan view showing a shield conductor pattern in the touch panel shown in FIG. 13.

The display device with a touch panel according to the embodiment 3 basically has the substantially same constitution as the above-mentioned embodiment 1 and differs from the embodiment 1 with respect to the constitution of a shield conductor 3.

That is, the shield conductor 3 used in the above-mentioned embodiment 1 is formed in a meshed shape where one piece of one member 3a and one piece of the other member 3b which intersect with each other traverse between the first portions 1a of two electrodes 1X arranged adjacent to each other.

On the other hand, the shield conductor 3 used in this embodiment 3 is, as shown in FIG. 13 and FIG. 14, formed in a meshed shape where two pieces of one members 3a and two pieces of the other members 3b which intersect with each other traverse between the first portions 1a of two electrodes 1X arranged adjacent to each other. In this embodiment 3, a width of each of one member and the other member (3a, 3b) is set to approximately 20 μm, for example, while a width of each of the opening portion 4a and the opening portion 4b is set to approximately 200 μm, for example.

In this manner, the embodiment 3 which includes the shield conductor 3 can also acquire the substantially equal advantageous effect as the above-mentioned embodiment 1.

It is needless to say that the meshed-pattern shape of the shield conductor 3 in this embodiment 3 is also applicable to the above-mentioned modification 1 of the embodiment 1 and the above-mentioned embodiment 2.

Embodiment 4

Figure 15:
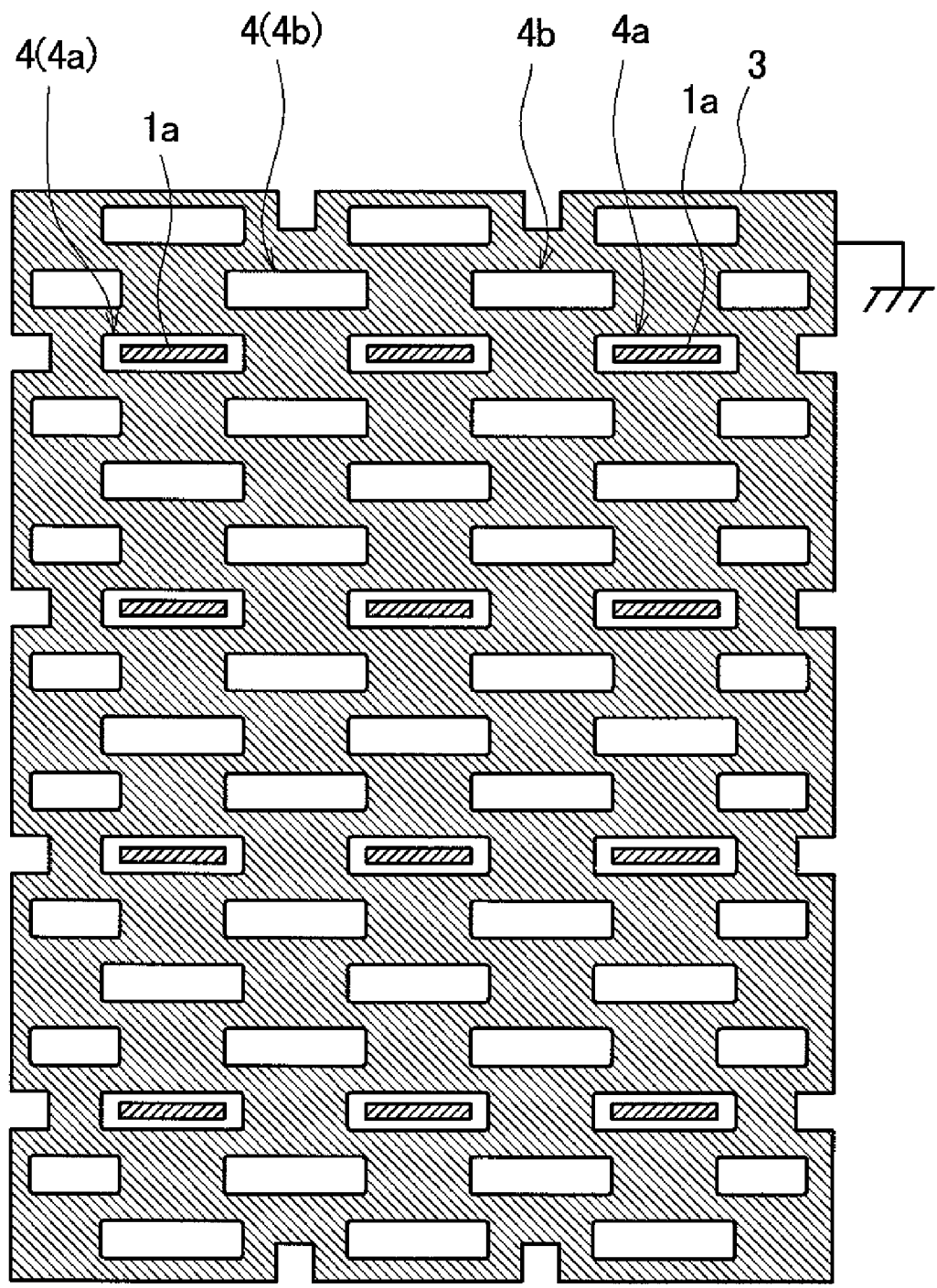
FIG. 15 is a plan view showing a shield conductor pattern of a touch panel which is incorporated into a display device with a touch panel according to an embodiment 4 of the present invention.

FIG. 15 is a plan view showing a shield conductor pattern of a touch panel which is incorporated into a display device with a touch panel according to an embodiment 4 of the present invention.

The display device with a touch panel according to the embodiment 4 basically has the substantially same constitution as the above-mentioned embodiment 1 and differs from the embodiment 1 with respect to the constitution of a shield conductor 3.

That is, the shield conductor 3 used in the above-mentioned embodiment 1 is formed in a meshed shape where one member 3a and the other member 3b which intersect with each other traverse between the first portions 1a of two electrodes 1X arranged adjacent to each other.

On the other hand, the shield conductor 3 used in this embodiment 4 is, as shown in FIG. 15, not formed in a meshed shape, but is formed in a pattern where a plurality of opening portions 4a and a plurality of opening portions 4b are simply arranged in a spotted manner.

In this manner, the embodiment 4 which includes the shield conductor 3 can also acquire the substantially equal advantageous effect as the above-mentioned embodiment 1.

It is needless to say that the pattern shape of the shield conductor 3 in this embodiment 4 is also applicable to the above-mentioned modification of the embodiment 1 and the above-mentioned embodiment 2.

In the above-mentioned embodiments (1, 2, 3, 4) and the modification, the explanation has been made with respect to the example where the first portions 1a and the second portions 1b of the electrodes 1X are formed of different conductive layers respectively. It is needless to say, however, that the present invention includes a case where the first portions 2a and the second portions 2b of the electrodes 2Y are formed of different conductive layers respectively.

In the above-mentioned embodiments (1, 2, 3, 4) and the modification, the explanation has been made with respect to the display device with a touch panel which includes the touch panel on the liquid crystal display panel as an example of the display panel. However, the present invention is not limited to such a display device, and the present invention is applicable to a display device with a touch panel which includes a touch panel on other display panel such as an organic EL display panel or an inorganic EL display panel.

Although the invention made by the inventors of the present invention has been specifically explained in conjunction with the embodiments, it is needless to say that the present invention is not limited to the above-mentioned embodiments, and various modifications and variations are conceivable without departing from the gist of the present invention.

What is claimed is:

1. A display device with a touch panel comprising:
a display panel; and
an electrostatic-capacitance-coupling touch panel which is arranged on a viewer-side surface of the display panel, wherein the touch panel includes:
a substrate;

a first shield conductor which is formed on the viewer-side surface of the substrate; an insulation film which is formed on the first shield conductor;

a plurality of first electrodes which are formed on the insulation film, extend in a first direction and are arranged parallel to each other in a second direction which intersects with the first direction; and a plurality of second electrodes which are formed on the insulation film, extend in the second direction and are arranged parallel to each other in the first direction which intersects with the second direction, wherein a predetermined signal is inputted to the first shield conductor, each one of the plurality of first electrodes includes a first portion which is formed on the viewer-side surface of the substrate and the second portion which is formed in a separated manner from the second electrode on the insulation film, the first portion is connected to the second portion via a contact hole formed in the insulation film, the first shield conductor has a plurality of opening portions, the plurality of opening portions include first opening portions in which the first portions are formed in openings and second opening portions in which the first portions are not formed in the openings, and the first portions are formed in the first opening portions.

2. A display device with a touch panel according to claim 1, wherein the first shield conductor has a meshed shape constituted of first members and second members which intersect with each other, and the first opening portions and the second opening portions are respectively opening portions which are formed by the first members and the second members which constitute the meshed shape.

3. A display device with a touch panel according to claim 2, wherein the second electrode has first portions which intersect with the first portions of the first electrode in plane and second portions which are contiguously formed with the first portions, the second portion of the first electrode has a planar square shape in which a width of the second portion of the first electrode is larger than a width of the first portion of the first electrode, the second portion of the second electrode has a planar square shape in which a width of the second portion of the second electrode is larger than a width of the first portion of the second electrode, the second portion of the first electrode and the second portion of the second electrode are arranged in a state where a side of the second portion of the first electrode and a side of the second portion of the second electrode which face each other in an opposed manner make an acute angle with respect to the first direction, and the first member and the second member of the first shield conductor which constitute the meshed shape are formed along the side of the second portion of the first electrode and the side of the second portion of the second electrode which face each other in an opposed manner.

4. A display device with a touch panel according to claim 3, wherein at least one of the first members and at least one of the second members of the first shield conductor which constitute the meshed shape are arranged between the first portions of two first electrodes arranged adjacent to each other.

5. A display device with a touch panel according to claim 1, wherein the display device further includes a plurality of lines which are formed around a region where the plurality of first electrodes and the plurality of second electrodes are formed, and are electrically connected to the plurality of first electrodes or the plurality of second electrodes respectively, the plurality of lines are formed on the viewer-side surface of the substrate, and the display device further includes a second shield conductor which is formed on the insulation film so as to cover the plurality of lines, and to which a predetermined signal is inputted.

6. A display device with a touch panel according to claim 5, wherein the touch panel further includes a protective film which is formed on the plurality of first electrodes and the plurality of second electrodes.

7. A display device with a touch panel according to claim 6, wherein the touch panel has a front panel formed on the protective film.

8. A display device with a touch panel according to claim 1, wherein the plurality of first electrodes and the plurality of second electrodes are formed of a transparent conductive film.

* * * * *